United States Patent [19]
Collins et al.

[11] Patent Number: 5,795,024
[45] Date of Patent: Aug. 18, 1998

[54] CLAM-SHELL PIVOT ASSEMBLY FOR A STRUCTURED VEHICLE SEAT

[75] Inventors: Cecil A. Collins, Sterling Heights; John F. Whalen, Macomb; Timothy J. Schmidt, Jr., Clawson, all of Mich.

[73] Assignee: Fisher Dynamics Corporation, St. Clair Shores, Mich.

[21] Appl. No.: 837,751

[22] Filed: Apr. 22, 1997

Related U.S. Application Data

[63] Continuation of Ser. No. 810,307, Feb. 28, 1997, which is a continuation-in-part of Ser. No. 565,987, Dec. 1, 1995, Pat. No. 5,711,577.

[51] Int. Cl.$^6$ ............................................. B60N 2/12
[52] U.S. Cl. ........................ 297/361.1; 297/440.21; 297/362.11; 297/452.18; 297/362.14
[58] Field of Search ........................... 297/361.1, 362.11, 297/216.15, 311, 344.11, 362.14, 440.21, 452.18, 452.2

[56] References Cited

U.S. PATENT DOCUMENTS

| | | | |
|---|---|---|---|
| 4,585,273 | 4/1986 | Higgs et al. | 297/452.18 |
| 4,588,228 | 5/1986 | Nemoto | 297/452.18 |
| 4,890,888 | 1/1990 | Kostin | 297/440.21 |
| 4,962,963 | 10/1990 | Robinson | 297/362.11 |
| 5,123,706 | 6/1992 | Granzow et al. | 297/362.11 X |
| 5,199,764 | 4/1993 | Robinson | 297/362.11 |
| 5,253,923 | 10/1993 | Gootee | 297/440.21 |
| 5,263,767 | 11/1993 | Asbjornsen et al. | 297/361.1 |
| 5,269,589 | 12/1993 | Brothers et al. | 297/440.21 |
| 5,292,178 | 3/1994 | Loose et al. | 297/362.11 X |
| 5,318,341 | 6/1994 | Griswold et al. | 297/362.11 |
| 5,435,624 | 7/1995 | Bray et al. | 297/362.11 |
| 5,452,941 | 9/1995 | Halse et al. | 297/452.2 X |
| 5,462,332 | 10/1995 | Payne et al. | 297/362.14 X |

*Primary Examiner*—Peter M. Cuomo
*Assistant Examiner*—Rodney B. White
*Attorney, Agent, or Firm*—Harness, Dickey & Pierce, P.L.C.

[57] ABSTRACT

A pivot arm assembly for a structured vehicle seat assembly accommodates loads applied to the seatback through a safety belt restraint system carried by the seat assembly. The pivot arm assembly includes a pair of C-shaped plates interconnected to define a clam-shell assembly. An arm segment of the pivot arm assembly extends into a hollow channel defined by the seatback frame and is fixedly attached thereto. The pivot arm assembly is pivotally mounted to a portion of the lower seat structure to permit the seatback to rotate relative thereto about a pivot axis. A drive arrangement is provided for rotating the pivot arm assembly about the pivot axis. The pivot arm assembly functions to efficiently and effectively transfer loads from the seatback to the lower seat structure, and in turn, to the vehicle structure.

23 Claims, 10 Drawing Sheets

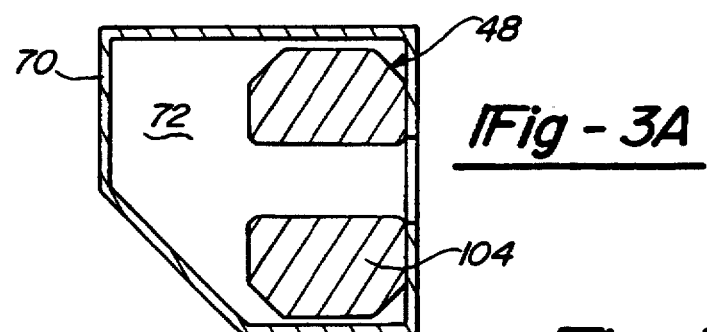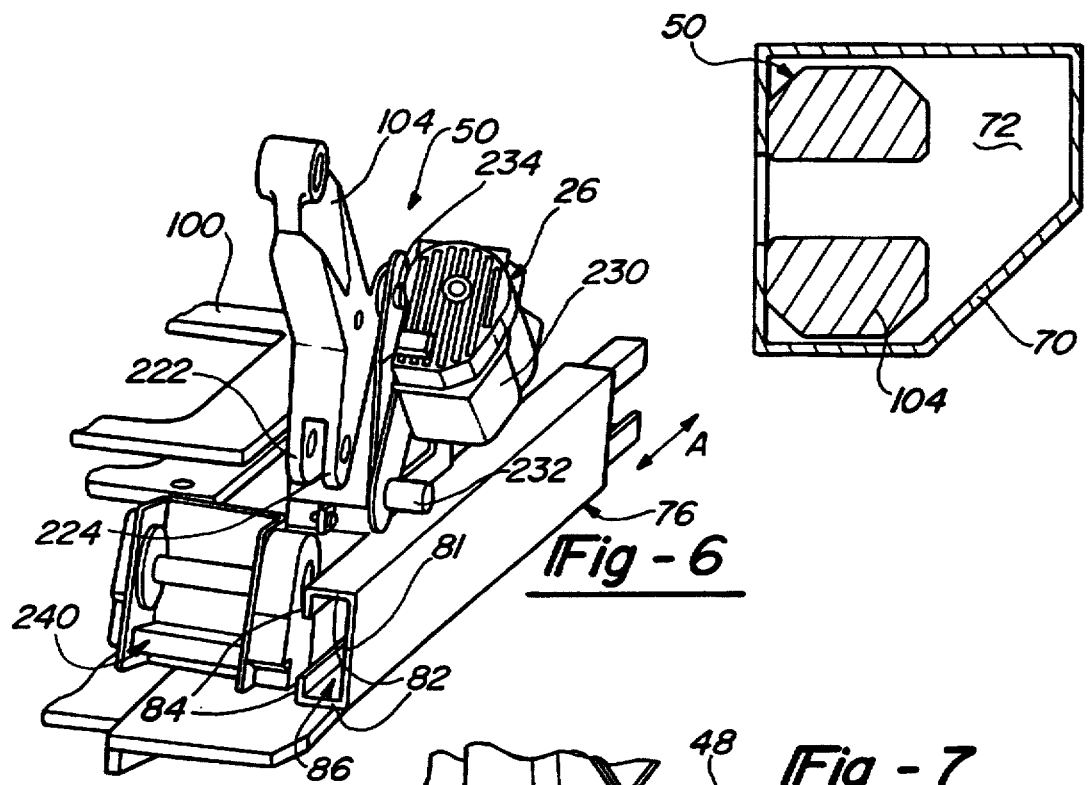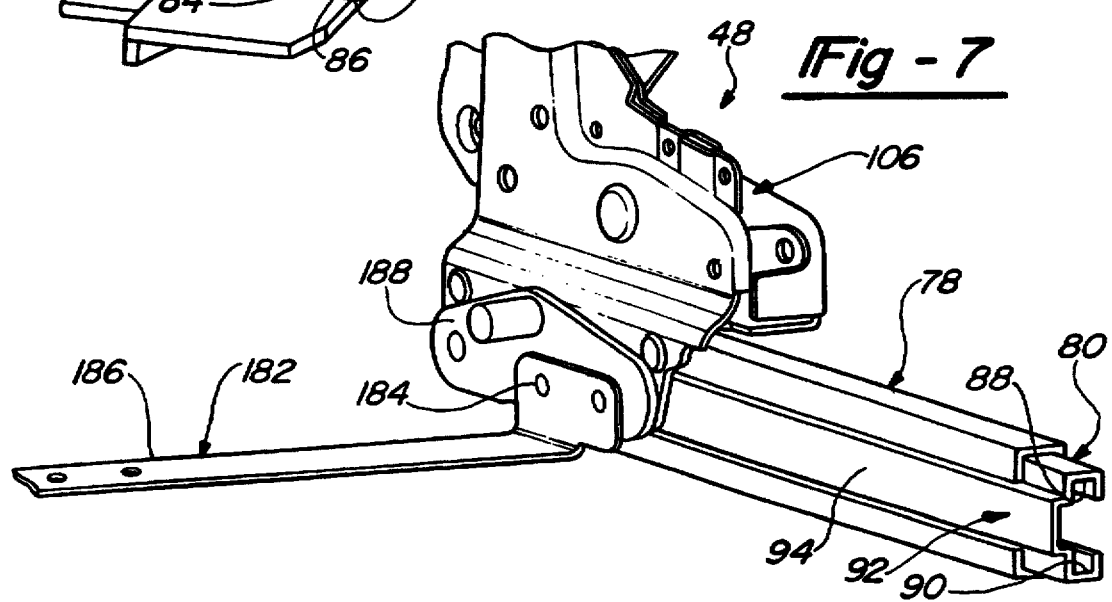

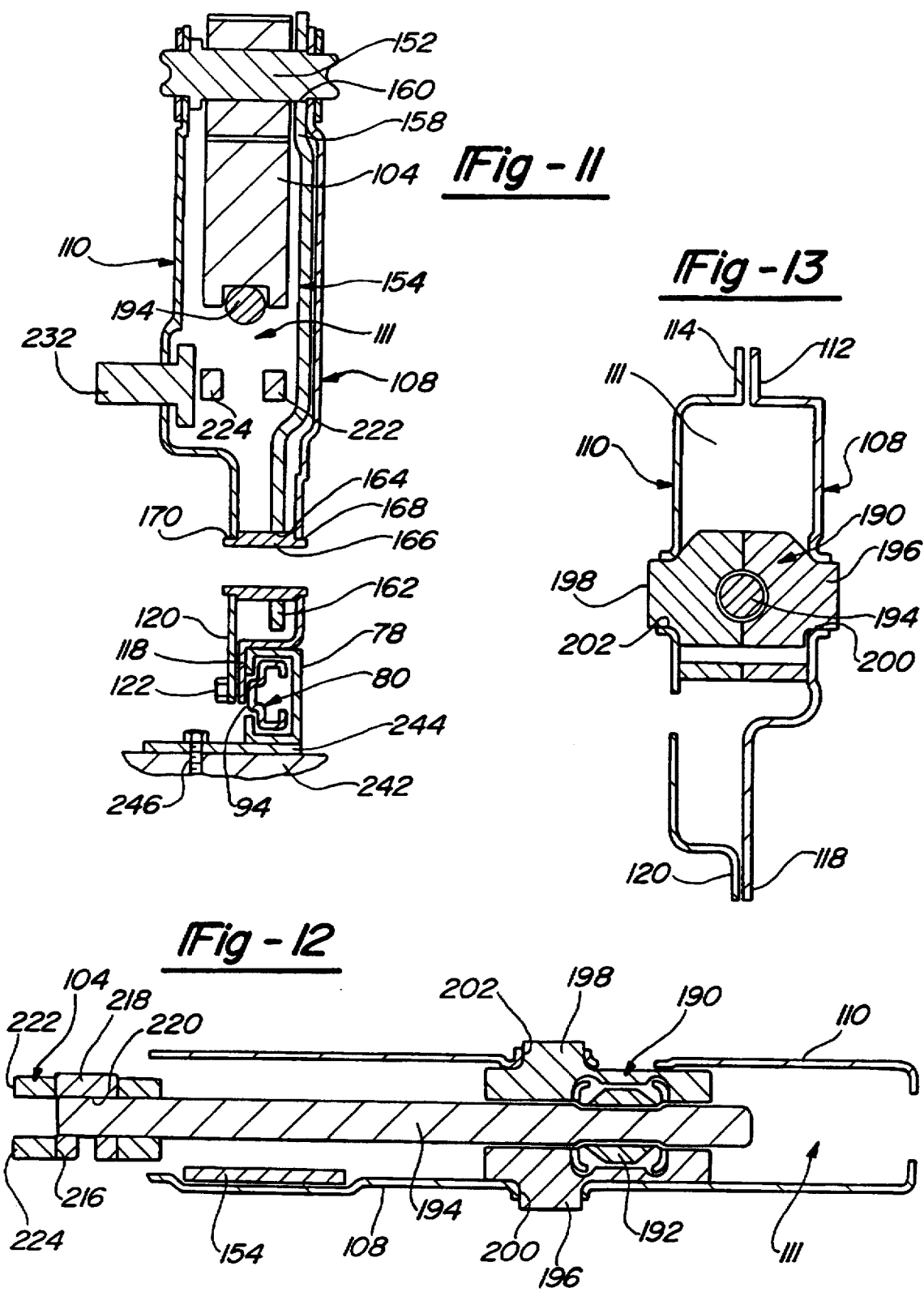

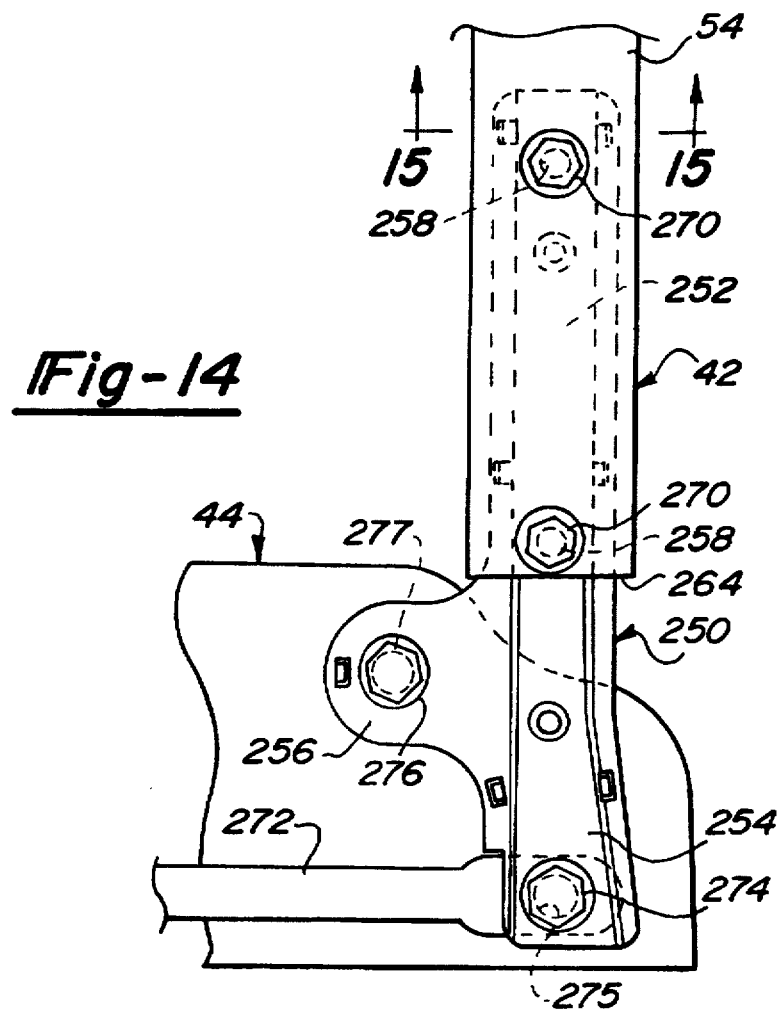
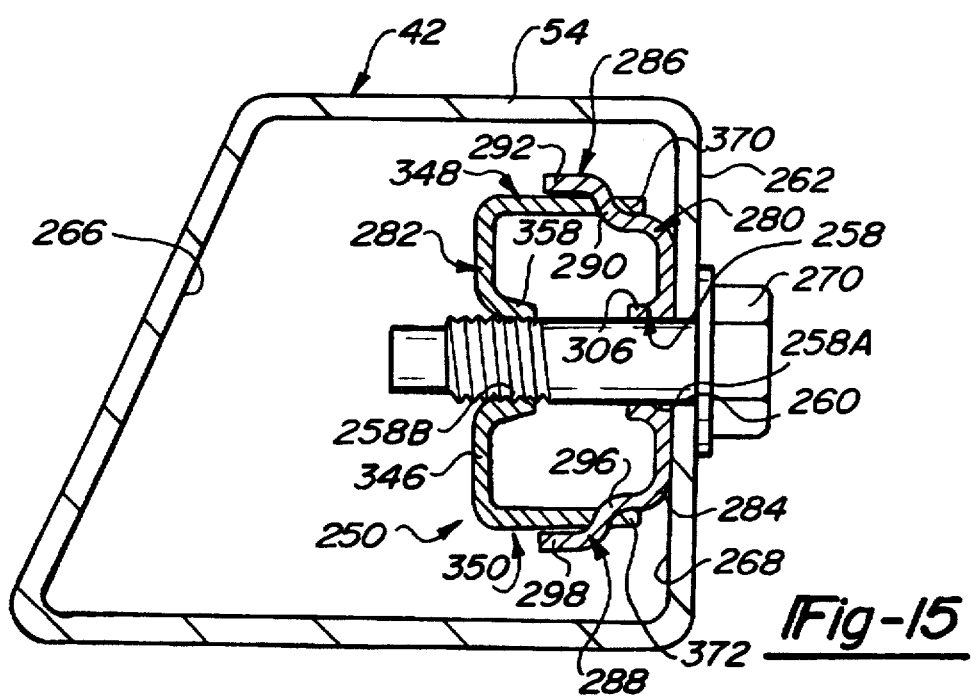

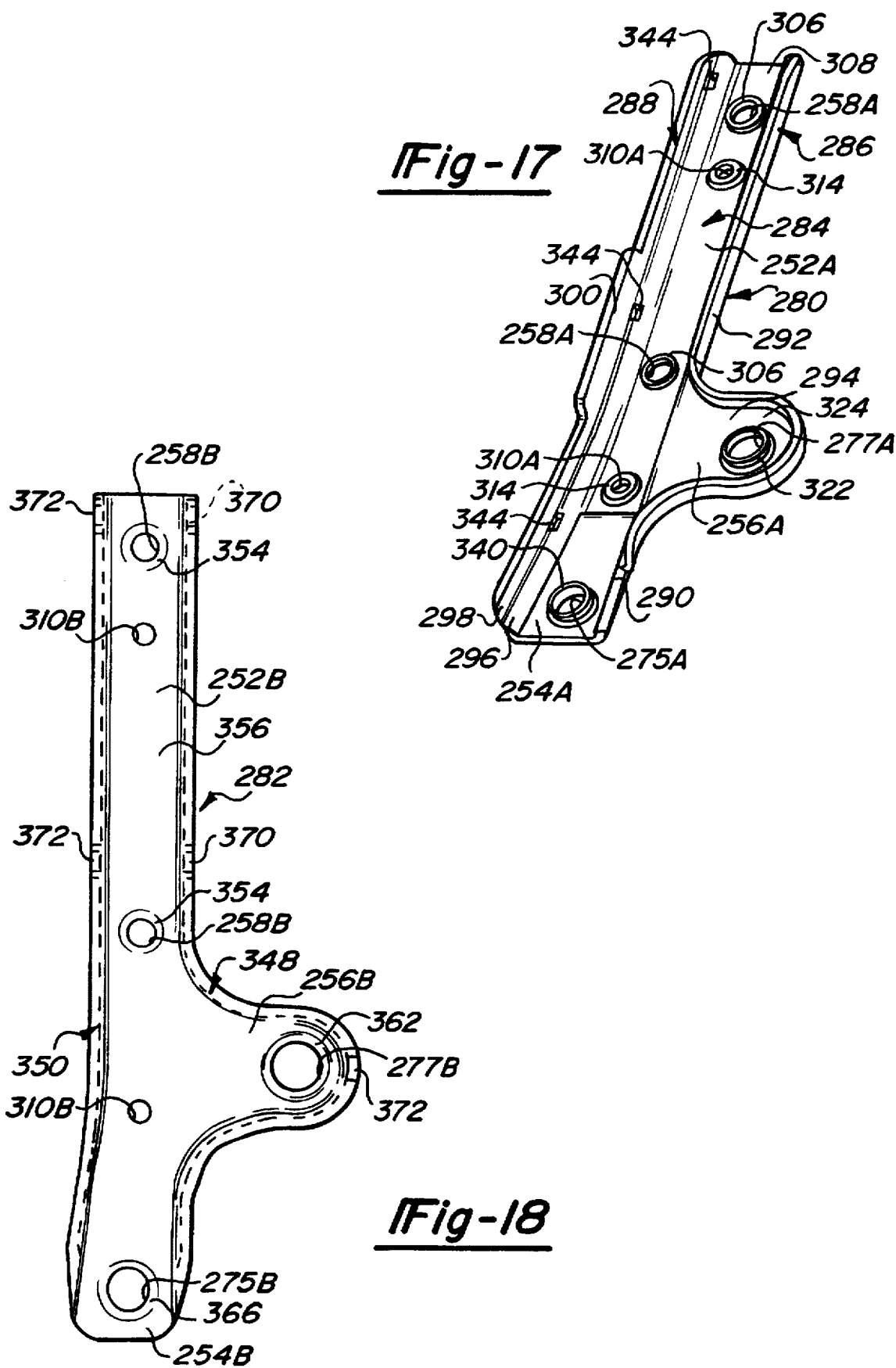

CLAM-SHELL PIVOT ASSEMBLY FOR A STRUCTURED VEHICLE SEAT

CROSS REFERENCE TO RELATED APPLICATION

This is a continuation of U.S. application Ser. No. 08/810,307, filed Feb. 28, 1997 which is a continuation-in-part of U.S. application Ser. No. 08/565,987 filed Dec. 1, 1995, now U.S. Pat. No. 5,711,577.

BACKGROUND OF THE INVENTION

The present invention relates in general to a seat assembly for a motor vehicle. More particularly, the present invention relates to a pivot assembly for a structured vehicle seat of the type that carries a retractable safety belt and includes a seatback pivotally interconnected to a lower seat structure. The pivot assembly is configured to transfer the potentially significant safety belt loads that may be incurred during severe deceleration or vehicle collision from the seatback to the lower seat structure, and in turn, to the vehicle frame.

Virtually all motor vehicles are equipped with restraint systems including a retractable safety belt for physically restraining a seat occupant when the vehicle is subjected to a high rate of deceleration which may occur, for example, during a vehicle collision or during severe braking. In conventional vehicles, the retractable safety belts are predominantly attached directly to the vehicle structure. For example, most modern safety belt systems utilize a belt retractor mounted to the vehicle floor pan which adjustably receives the retractable belt. The retractable belt extends upward from the belt retractor along the B-pillar of the vehicle to a guide ring mounted to the B-pillar. The retractable belt then extends downward from the B-pillar guide ring adjacent to the belt retractor where an end of the retractable belt is connected to the vehicle floor. A tongue plate is mounted on the safety belt and is slidably movable therein between the end anchored to the vehicle floor and the guide ring on the B-pillar. A buckle is interconnected with the vehicle floor on the opposite side of the occupant seat.

When the tongue plate is pulled across the occupant and releasably inserted into the buckle, the retractable belt forms a lap belt portion across the occupant's midsection and a shoulder belt portion extending diagonally across the occupant's torso. The lap belt portion and shoulder belt portion cooperate to retain the occupant in the seat. While mounted to the vehicle frame independently from the seat, the safety belt restraint system is intended to be positioned in such a proximity to cooperate with the seat for effectively and comfortably restraining the seat occupant during severe deceleration.

While conventional safety belt restraint systems, such as the type described above, have proven to be commercial acceptable for many applications, each is attendant with drawbacks and subject to improvement. In many applications, the operation and comfort of such a conventional safety belt restraint system conflicts with the operational requirements of modern vehicle seat assemblies. In this regard, virtually all modern vehicles are equipped with seating assemblies that can be selectively adjusted in at least the fore and aft direction for providing increased comfort and convenience to the seat occupant. Furthermore, modern vehicle seat assemblies, particularly those intended for front seat applications, are almost exclusively constructed to include a seatback mounted for pivotal movement relative to a seat cushion for selective articulation between a generally upright position and a fully reclined position.

Through conventional adjustment of a seat assembly in the fore or aft direction, an occupant seated on the seat assembly is effectively translated relative to the mounting points (i.e., belt retractor, B-pillar guide ring, belt end connection, and tongue plate) of the safety belt restraint system. As a result, it frequently becomes inconvenient and uncomfortable for a seat occupant to correctly employ and/or utilize the safety belt restraint system, thereby often discouraging use of the safety belt restraint system. For example, if the vehicle seat assembly is selectively moved to a forwardmost position, it is often difficult for the seat occupant to reach back to grasp the seat belt tongue plate carried adjacent the B-pillar. This difficulty is particularly true with elderly occupants, occupants with physical disabilities and occupants of smaller physical stature. Furthermore, when the position of the vehicle seat assembly is forwardly adjusted, the shoulder belt portion of the retractable belt may abrade the seat occupant's neck, thereby resulting in occupant irritation or discomfort.

Other difficulties and problems are encountered when a conventional seat assembly is adjusted to its rearwardmost position. For example, the shoulder belt portion of the retractable belt is more susceptible to slight displacement from the upper torso of the restrained occupant. As a result, the occupant may be undesirably permitted to momentarily shift forward unrestrained by the shoulder belt portion of the retractable belt when the vehicle is subject to severe deceleration forces. Similar inconveniences are encountered by the vehicle occupant when the seatback is pivotally articulated from a standard operating position towards its fully reclined position. Furthermore, a restrained seat occupant having the vehicle seat in the rearwardmost position may be unable to move the seat to a more forward position without first readjusting the retractable belt.

The noted difficulties and inconveniences associated with conventional seat assemblies and safety belt restraint systems are further complicated in seating applications for convertible vehicles. In this regard, for obvious reasons, it is desirable for convertible vehicles to eliminate an upwardly extending B-pillar. As a result, the upper B-pillar mounting point for the retractable belt is often inconveniently positioned relative to the seat occupant, frequently resulting in less than ideal belt fit and occupant discomfort.

It is also known to mount a safety belt restraint system directly to a seat assembly. In such an arrangement, the structure of the seat assembly must be of sufficient strength to accommodate the potentially significant loads that may be generated as a result of vehicle deceleration from impact, severe braking, or the like. However, known "structured" seat assemblies have also been associated with various disadvantages. The primary problem with such known constructions resides in an inability to efficiently and effectively transfer deceleration loads received by the seatback to the vehicle structure. More specifically, known constructions for structured seat assemblies have been unable to fully retain the operation features (e.g., pivotally mounted seatback, fore and aft translation, etc.) demanded by consumers without utilizing complex arrangements for pivotally mounting the seatback to the lower seat structure. When functionally acceptable, these complex arrangements are often weight prohibitive, cost prohibitive, or both.

In view of the foregoing, a need clearly exists to develop a pivot assembly for vehicle seat assembly having a structured frame for absorbing loads received from an attached safety belt restraint system and transferring such loads to the vehicle frame. More specifically, a need exists to develop a vehicle seat assembly which efficiently and effectively overcomes the known shortcomings associated with vehicle seat constructions and yet which can be readily adapted for use in various vehicular seating applications.

SUMMARY OF THE INVENTION

Accordingly, it is an object of the present invention to provide an improved pivot assembly for a structured vehicle seat that is relatively simple in design and construction, inexpensive to fabricate and assemble, and yet is durable and highly reliable.

A more detailed object of the present invention is to provide a pivot assembly for a vehicle seat assembly having a belt restraint system mounted to and carried by the seat assembly so that regardless of the position of the seat assembly in the vehicle, the belt restraint system remains in a constant position relative to the seat occupant.

It is another object of the invention to provide a pivot assembly for a vehicle seat assembly which is capable of withstanding the safety belt loads incurred during a vehicle collision and transferring such loads from a seatback frame to a lower seat structure and, in turn, to the vehicle frame.

It is a further object of the present invention to provide a pivot assembly fixedly attached to a seatback frame of a vehicle seat for interconnecting the seatback frame to a lower seat structure.

It is yet a further object of the present invention is to provide a pivot assembly incorporating a drive arrangement for rotating a seatback of a structured vehicle seat between a generally upright position and a fully reclined position.

These and other objects are provided by a structured vehicle seat assembly which includes a pivot assembly operative for transferring loads from a seatback frame to a lower seat structure. In one preferred arrangement, a vehicle seat assembly is constructed to include a first pivot assembly adjacent an inboard side and a second pivot assembly adjacent an outboard side. Each of the pivot assemblies preferably includes an integrally formed pivot arm which functions to interconnect the seatback frame and a lower seat structure. In another preferred arrangement, the pivot assemblies have a pair of arm plates interconnected to define a clam-shell pivot arm assembly. In yet another preferred arrangement, a pivot assembly is only provided at the outboard side of the structured vehicle seat assembly.

In one form, the structured vehicle seat assembly of the present invention includes a lower seat structure and a seatback frame. The seatback frame is pivotally mounted relative to the lower seat structure for selective movement to angular reclined positions defined between a generally upright position and a fully reclined position. A safety belt restraint system is carried by the lower seat structure and the seatback frame. The structure vehicle seat assembly further includes a pivot assembly for pivotally interconnecting the seatback frame to the lower seat structure. Preferably, the pivot assembly is fixedly attached to the seatback frame.

In a more preferred form, the structured vehicle seat assembly of the present invention includes a lower seat structure having a seatpan frame and a slide assembly for selectively translating the seatpan frame in fore and aft directions. The structured vehicle seat assembly further includes a seatback frame pivotally interconnected to the lower seat structure for selective movement between plural angular positions relative to the lower seat structure. The seatback frame includes a lower end and an upwardly extending channel adjacent one of an inboard side and an outboard side of the seatback frame. The upwardly extending channel is open adjacent the lower end. A safety belt restraint system is attached to and carried by the lower seat structure and the seatback frame. The structured vehicle seat assembly further includes a pivot assembly for pivotally interconnecting the seatback frame to the lower seat structure for selectively rotation between a generally upright position and a fully reclined position. The pivot assembly includes a housing attached to the slide assembly and a generally boot-shaped pivot arm pivotally mounted to the housing for rotation about a pivot pin. The pivot arm includes an upper portion which at least partially extends into the upwardly extending channel of the seatback frame. Preferably, the upper portion of the pivot arm is fixedly attached to the seatback frame.

BRIEF DESCRIPTION OF THE DRAWINGS

Further objects, features and advantages of the present invention will become apparent from analysis of the following written specification and the accompanying drawing and the appended claims in which:

FIGS. 3A and 3B are cross sections through the support tubes shown in phantom in FIG. 2;

FIG. 6 is a rear perspective view of a portion of the lower seat structure and outboard pivot assembly of the passenger-side structured seat assembly of FIG. 2 further illustrated to include a shoulder belt retractor and a lap belt retractor;

FIG. 7 is a partial front perspective view of the structured seat assembly of FIG. 2, illustrating the interconnection between the inboard pivot assembly and an exemplary seat slide assembly;

FIG. 11 As a cross-sectional view generally taken along line 11—11 of FIG. 5 and further shown to include the associated seat slide assembly and mounting to the vehicle structure;

FIG. 12 is a cross-sectional view generally taken along line 12—12 of FIG. 5;

FIG. 13 is a cross-sectional view generally taken along line 13—13 of FIG. 5;

FIG. 14 is a side view of a pivot arm assembly constructed in accordance with an alternative embodiment of the present invention and shown interconnecting the seatback frame to the lower seat structure of a driver-side structured vehicle seat such as that shown in FIG. 1;

FIG. 15 is a cross-sectional view generally taken along line 15—15 of FIG. 14;

FIG. 17 is a perspective view of the outer arm plate associated with the pivot arm assembly rotated 180 degrees from that shown in FIG. 16;

FIG. 18 is an elevational view of the inner arm plate associated with the pivot arm assembly of FIG. 16;

The following detailed description utilizes various terminology intended to indicate general direction for purposes of describing the figures to which reference is being made. For example, it will be understood that the terminology "inboard" and "outboard" will be used as a convenience to designate the lateral sides of the seat assembly. It will be further understood that the terminology "fore" and "aft" will be used to refer to directional movement of the seat toward the front of the vehicle and away from the front of the vehicle, respectively.

DETAILED DESCRIPTION OF THE PREFERRED EMBODIMENT

In general, the present invention is directed to structured seat assemblies of the type that are particularly well-suited for use in motor vehicle seating applications. As is known, structured seat assemblies are equipped to carry a safety belt restraint system such that the seat assembly may be installed directly in the motor vehicle. Such stand-alone or all-belts-to-seat structural seats are finding increased application in motor vehicles. Accordingly, the present invention is directed to an improved pivot assembly for use in structured seat assemblies. The exemplary seating arrangement shown throughout the drawings is illustrated to be specifically adapted for application in the front seating area of a motor vehicle as front driver-side and passenger-side seat assemblies. However, it is to be understood that the teachings of the present invention are not limited to the particular vehicle seating arrangement shown. That is, the illustrated application is merely an exemplary representation of the general type of environment into which the present invention may be incorporated.

Figure 1:
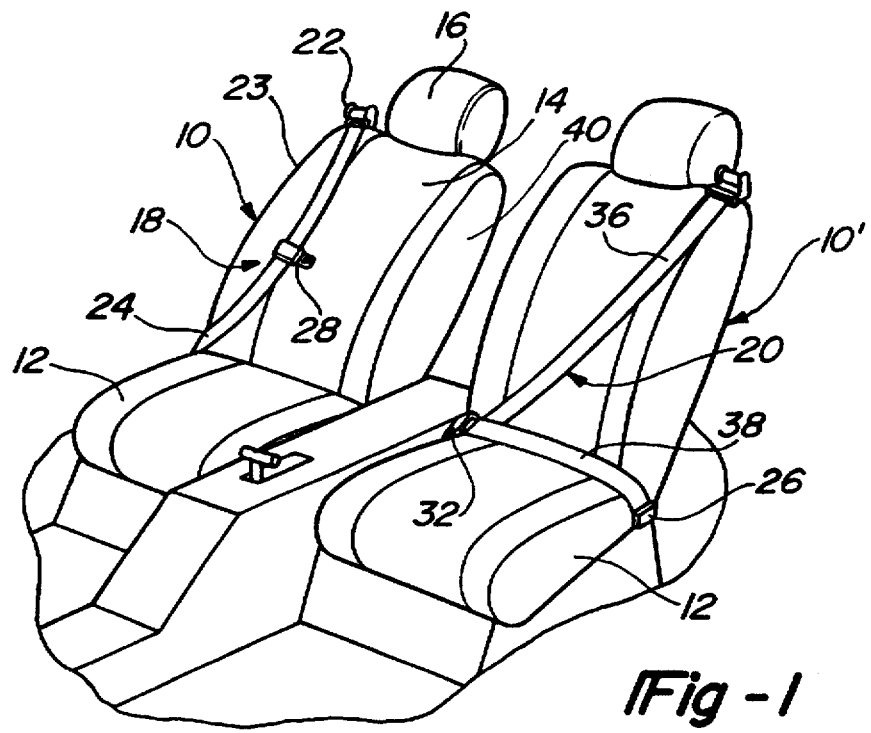
FIG. 1 is a front perspective view of a portion of a passenger seating area in an exemplary motor vehicle illustrating an exemplary pair of structured vehicle seat assemblies constructed in accordance with the teachings of a preferred embodiment of the present invention.

Referring now generally to the drawings in which like elements are identified with identical reference numerals throughout, and particularly to FIG. 1, a portion of a front seating area of a motor vehicle is shown to include a pair of independently positionable seat assemblies constructed to include pivot assemblies in accordance with the teachings of the present invention. For ease of reference, the passenger-side seat assembly is shown on the left-hand side of FIG. 1 and is identified throughout the drawings by reference numeral 10 and the driver-side seat assembly is identified by reference numeral 10'. It will be understood that passenger-side seat assembly 10 and driver-side seat assembly 10' are functionally identical, and further that the construction driver seat assembly 10' is a mirror image to that of passenger-side seat assembly 10. Thus, while this detailed description will focus primarily on the construction and operation of passenger-side seat assembly 10, a thorough understanding of driver-side seat assembly 10' will be apparent therefrom.

Seat assembly 10 is illustrated to include a seat cushion 12, a padded seatback 14, and a headrest 16 for supporting a vehicle occupant (not shown) in a conventional manner. When in a standard operating position as illustrated in FIG. 1, seatback 14 extends upwardly at the rear of seat cushion 12 and is angled slightly rearward. As will be discussed in further detail below, seatback 14 is mounted for pivotal adjustment relative to seat cushion 12 for occupant convenience and comfort. That is, seatback 14 is pivotally adjustable to plural angular positions defined between the standard operating position, or generally upright position, and a fully reclined position (not specifically shown).

Seat assembly 10 is further shown to include a safety belt restraint system 18 mounted to and carried by seat assembly 10. In the exemplary embodiment illustrated in FIG. 1, safety belt restraint system 18 is shown to include a safety belt 20 adapted for restraining the seat occupant in a seated position adjacent seat cushion 12 and padded seatback 14 when the vehicle is subject to severe deceleration forces due to severe braking or a vehicle collision. Safety belt 20 is shown to extend outwardly from seat assembly 10 adjacent a top outboard corner of seatback 14 where it is routed through a belt slide assembly 22. It will be appreciated by those skilled in the art, that belt slide assembly 22 is vertically adjustable to comfortably accommodate seat occupants of varying heights.

As shown with respect to the seat assembly 10, safety belt 20 extends along an outboard side 23 of seat assembly 10 when not in use. An end 24 of safety belt 20 is interconnected to seat assembly 10 through a lower or lap belt retractor 26 (shown in FIG. 1 in connection with driver-side seat assembly 10'). As will be detailed hereinafter, the opposite end of safety belt 20 is interconnected to seat assembly 10 through an upper or shoulder belt retractor. A tongue plate 28 is adjustably positioned on safety belt 20 between belt slide assembly 22 and lower belt retractor 26. A buckle component 32 is attached to an inboard side 40 of seat assembly 10 and is specifically adapted for releasable engagement of tongue plate 28 in a generally conventional manner. As illustrated with respect to driver-side seat assembly 10', when tongue plate 28 is inserted into buckle component 32, safety belt 20 forms an adjustable shoulder belt portion 36 for diagonally traversing the torso of the seat occupant and an adjustable lap belt portion 38 for traversing the seat occupant's waist. Safety belt restraint system 18 of seat assembly 10 of the present invention has been shown and described in this manner. However, nothing herein should be construed so as to limit seat assembly 10 of the present invention to any specific safety belt restraint system. That is, the teachings of the present invention are applicable for use with any of a number of safety belt restraint systems and the system illustrated should merely be considered to be exemplary.

With reference to FIGS. 2 through 5, seat assembly 10 shown in FIG. 1 is illustrated with its upholstery, padding, headrest 16 and safety belt restraint system 18 removed to more clearly illustrate the novel structure and operational features of the present invention. Seat assembly 10 is shown generally to include a seatback frame 42 and a lower seat structure 44. Seat assembly 10 is shown to further include a pivot arrangement 46 which preferably comprises an inboard pivot assembly 48 and an outboard pivot assembly 50. As will become more apparent below, inboard and outboard pivot assemblies 48 and 50 cooperatively operate for pivotally mounting seatback frame 42, and in turn seatback 14, relative to lower seat structure 44 for rotation between plural angular positions.

Through inboard and outboard pivot assemblies 48 and 50, seatback frame 42 is pivotally movable between the standard operating position and the fully reclined position. Inboard and outboard pivot assemblies 48 and 50 further cooperate to transfer loads applied to seatback frame 42 (e.g., directly from the seat occupant or indirectly through safety belt 20) to lower seat structure 44. The primary focus of the present invention is directed to the construction and operation of inboard and outboard pivot assemblies 48 and 50 and their interconnection with cooperating structure of seatback frame 42 and lower seat structure 44. However, a further understanding of the exemplary seatback frame 42 and lower seat structure 44 with which pivot assemblies 48 and 50 are specifically adapted to cooperate is warranted prior to turning to the details of pivot assemblies 48 and 50.

Figure 2:
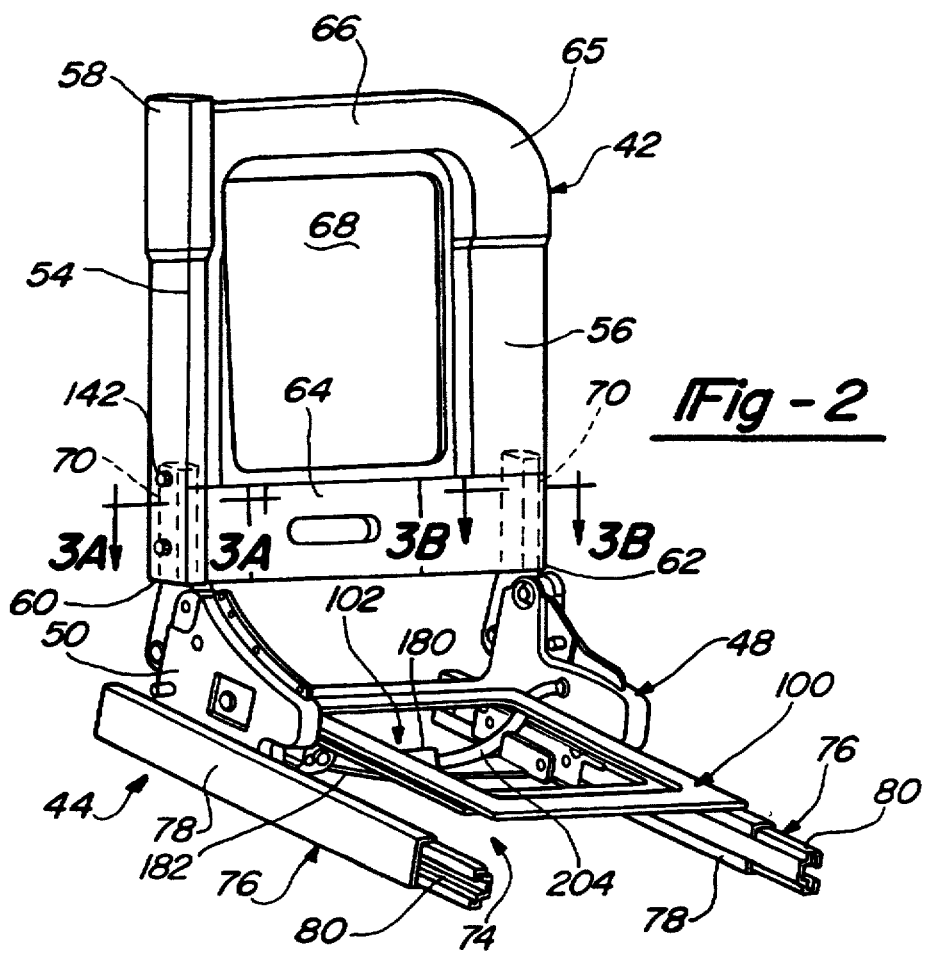
FIG. 2 is an enlarged front perspective view of the passenger-side structured seat assembly shown in FIG. 1, with the upholstery, cushions, and safety belt restraint system removed to illustrate its components with greater detail.

With specific reference to FIG. 2, seatback frame 42 is generally rectangular in shape and includes a hollow outboard beam 54 upwardly extending along outboard side 23 of seat assembly 10 and a corresponding hollow inboard beam 56 upwardly extending along inboard side 40 of seat assembly 10. Outboard beam 54 is open at an upper end 58 and is adapted to receive safety belt slide assembly 22. Adjacent their respective lower ends 60 and 62, outboard and inboard beams 54 and 56 are interconnected by a lower intermediate member 64. Lower ends 60 and 62 of outboard and inboard beams 54 and 56, respectively, are open, thereby defining two parallel channels (not specifically shown) accessible from the lower end of seatback frame 42. Upper end 58 of outboard beam 54 and an upper end 65 of inboard beam 56 are interconnected by an upper intermediate member 66. As will be appreciated more fully below, inboard and outboard beams 56 and 54 are specifically adapted to receive a portion of pivot assemblies 48 and 50, respectively, and thereby interconnect seatback frame 42 with lower seat structure 44. Seatback frame 42 is preferably constructed of steel or other suitable high strength material.

Seatback frame 42, while providing the additional structure and strength necessary to accommodate potentially significant seat belt loads, utilizes efficient management of material, thereby avoiding the use of excess material where not required. One example of this efficient management of material is that seatback frame 42 is generally rectangular in shape having a substantially rectangular central aperture 68 for purposes of weight reduction and functions to direct loads downward to pivot assemblies 48 and 50. A second example of this material management is that seatback frame 42 is further constructed to include a pair of support tubes 70, shown in phantom in FIG. 2 and further shown in the cross-sectional views of FIGS. 3A and 3B, located in outboard and inboard beams 54 and 56. Support tubes 70 function to sufficiently strengthen seatback frame 42 for interconnection with and transferring seat belt loads to pivot arrangement 46 without adding unnecessary weight or interfering structure. As shown in the cross-sectional views of FIGS. 3A and 3B, support tubes 70 define channels 72 for directly receiving a portion of inboard and outboard pivot assemblies 48 and 50. The specific interconnection between support tubes 70, inboard and outboard beams 56 and 54 and pivot assemblies 48 and 50 will be discussed in detail below. Alternatively, pivot assemblies 50 and 48 could be secured directly within open ends 60 and 62 of outboard and inboard beams 54 and 56, respectively, without utilization of support tubes 70 in those applications in which beams 54 and 56 are of sufficient strength and rigidity to transfer belt loading from seatback frame 42 to pivot arrangement 46.

With continued reference to FIG. 2 and additional reference to FIGS. 6 and 7, lower seat structure 44 of seat assembly 10 is shown to include a seat adjustment mechanism 74 of the type commonly referred to as a "two-way" adjuster that is adapted to permit a seat occupant to selectively adjust the longitudinal (i.e., "fore" and "aft") position of seat assembly 10. To provide means for such a longitudinal adjustment, seat adjustment mechanism 74 includes a pair of laterally-spaced seat slide devices 76 which each include an outer track member 78 and an inner track member 80. While not specifically illustrated, it will be understood by those skilled in the art that seat adjustment mechanism 74 further includes a generally conventional device (not shown) operably coupled to inner track members 80. The device is selectively actuable for permitting synchronous movement of inner track members 80 relative to outer track members 78. As will be appreciated, the particular construction of seat adjustment mechanism 74 is not intended to limit the present invention such that any such seat slide mechanism constructed to withstand the loading required in structured seat applications can be used herewith.

In the embodiment illustrated, outer track members 78 are elongated structural members which are similarly configured to include a generally C-shaped cross-section. Outer track member 78 more specifically includes a side wall 81 and a pair of horizontally spaced legs 82 extending therefrom. Formed at the distal end of each horizontally spaced leg 82 is an inwardly bent lip or flange 84. Thus, outer track members 78 cooperate to define elongated slide channels 86 having an inwardly facing open portion.

Inner track members 80 are shown as elongated structural members having a modified C-shaped cross-sections. Inner track members 80 are sized to be cooperatively received within elongated slide channels 86 of the respective outer track members 78. More specifically, inner track members 80 are identically constructed to each include an upper U-shaped segment 88 and a lower U-shaped segment 90 retained within the slide channels 86 defined by the corresponding outer track members 78. Inner track member 78 further includes a mounting segment 92 interdisposed therebetween. Mounting segment 92, which interconnects segment 88 and segment 90, also has a U-shape and further includes a generally vertical side 94 slidably disposed within the inwardly facing open portion of outer track member 78. Thus, inner track members 80 are interlocking interfitted with their corresponding outer track member 78 in a manner which facilities the transfer of vertically directed loads to the vehicle's sill or floor structure.

As noted, each inner track member 80 is slidably mounted with respect to its corresponding outer track member 78 for relative bi-directional movement in the fore and aft directions as indicated by Arrow A in FIG. 6. As will be appreciated by those skilled in the art, suitable bearings (not shown) or other functionally equivalent structure may be incorporated between outer track member 78 and inner track member 80 to facilitate sliding movement therebetween.

Lower seat structure 44 is further shown to include a seatpan frame 100. Seatpan frame 100 is generally rectangular in construction and includes a rectangular aperture 102 for purposes of overall weight reduction and to facilitate mounting of appropriate springs and padding (not shown). Seat mounting fasteners (not shown), such as threaded studs and nuts, serve to secure seatpan frame 100 to a mounting bracket (not shown), which is in turn secured to inner track member 80. In this manner, seatpan frame 100 is mounted for sliding movement with inner track members 80 on outer track members 78.

With general reference to FIGS. 2–13, inboard and outboard pivot assemblies 48 and 50 of the present invention will now be described. To a significant degree, inboard pivot assembly 48 and outboard pivot assembly 50 are identical in construction and function. To facilitate description thereof, inboard pivot assembly 48 will first be described and subsequently the differences of outboard pivot assembly 50 will be addressed. Common reference numerals will be used between the pivot assemblies 48 and 50 to denote substantially identical components. However, it should be noted that in some structured seat applications, it may only be required to equip the seat assembly with outboard beam 54 and outboard pivot assembly 50 since the great majority of all belt loading is transferred through the outboard portion of seatback frame 42 to the outboard portion of lower seat structure 44. In such applications, the inboard pivot assembly 48 would be replaced by an otherwise conventional hinge mount interconnecting the inboard side of seatback frame 42 to the inboard side of lower seat structure 44.

Inboard pivot assembly 48 includes a connector member 104, or pivot arm, which is adapted to be pivotally attached to lower seat structure 44 and which is also adapted to be rigidly fixed to seatback frame 42. In a manner which will be described below, pivot arm 104 is shown to be pivotably attached to a housing 106 which, in turn, is attached to the inboard inner track member 80 of seat slide mechanism 54. Housing 106 is shown to be preferably constructed to include an outer plate member 108 and an inner plate member 110 which cooperate to define a housing cavity 111. Outer plate member 108 and inner plate member 110 each include a main body portion having a generally shoe-shape.

Outer and inner plate members 108 and 110 are joined at their respective upper edges through a pair of cooperating mounting flanges 112 and 114 integrally formed with outer and inner plate members 108 and 110, respectively. Suitable fasteners 116, such as rivets, pass through apertures 118 formed in each of the pair of mounting flanges 112 and 114. Adjacent its lower end, outer plate member 108 includes a mounting flange 119 for cooperating with a downwardly extending lower edge 120 of inner plate member 110. Lower edge 120 and flange 118 are joined by way of suitable fasteners, such as rivets 121, and, in turn, are jointly attached to vertical side 94 of inner track member 80 with bolts 122. Thus, inboard pivot assembly 48 is mounted for bi-directional translational movement with inner track member 80 between fore and aft positions.

Figure 4:
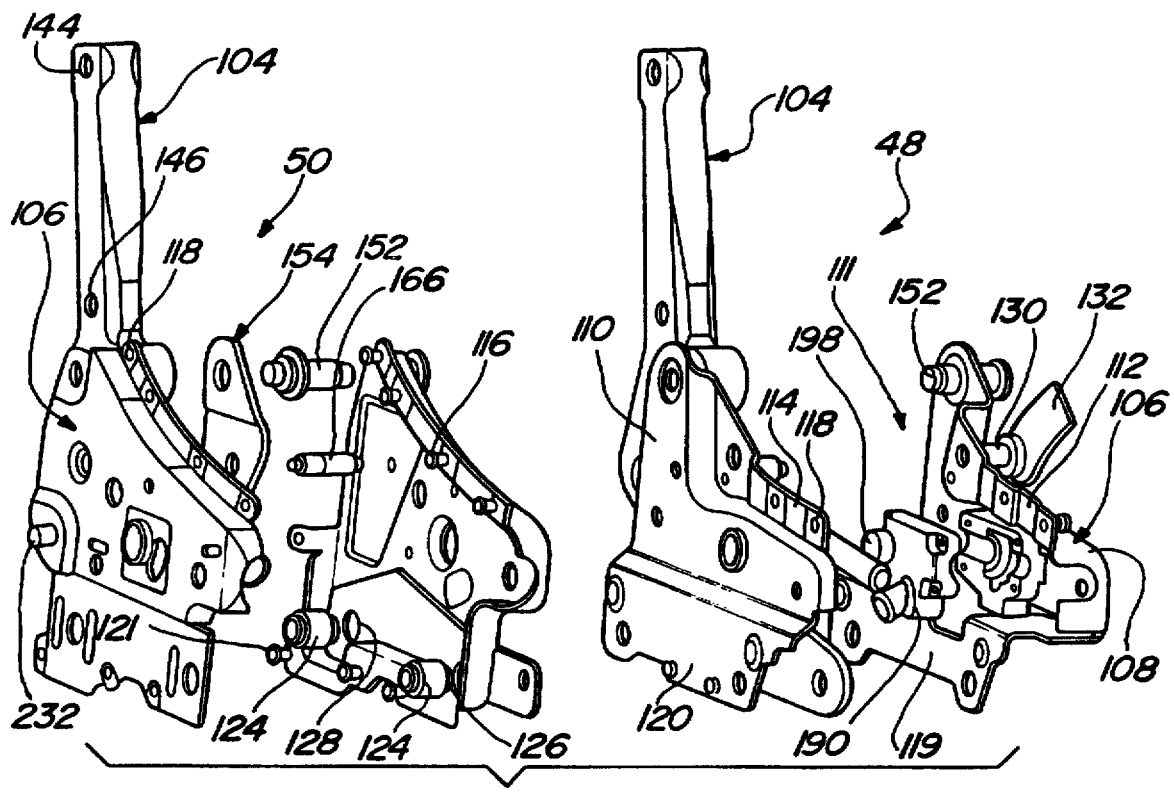
FIG. 4 is a partially exploded view of the inboard and outboard pivot assemblies defining the pivot arrangement shown in FIG. 2.

Spacing is maintained between the outer and inner plate members 108 and 110 through a pair of generally cylindrical mounting spacer 124 (shown in FIG. 4). Each mounting spacer 124 includes a reduced diameter portion 126 at each of its ends which is adapted to be received into corresponding cylindrical apertures 128 formed on the inner sides of the outer plate member 108 and inner plate member 110. A mounting stud 130 outwardly extends from outer plate 108 to which a belt portion, partially shown at 132, is interconnected. Belt portion 132 is attached to buckle member 32.

Figure 8:
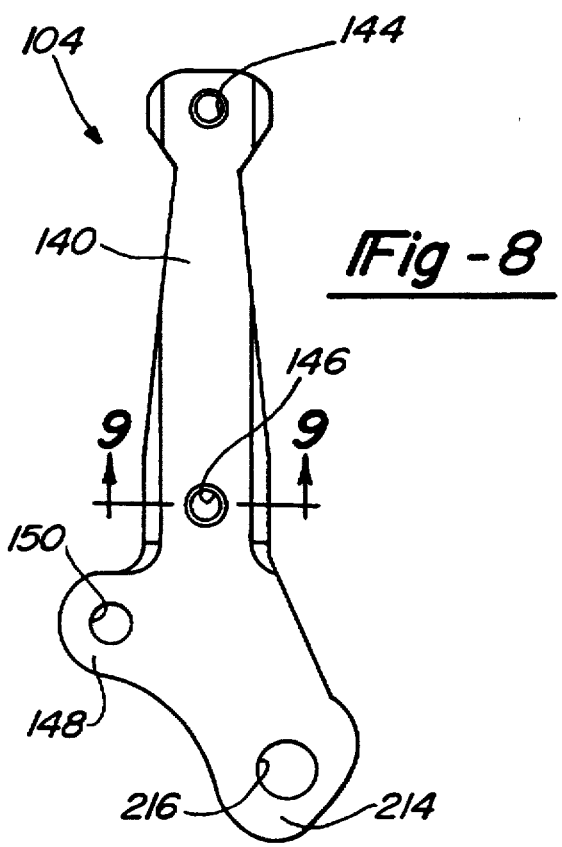
FIG. 8 is a side view of the pivot arm shown in FIGS. 2 through 6.
Figure 9:
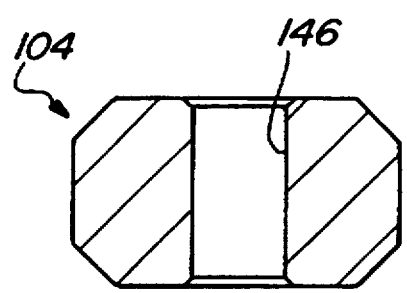
FIG. 9 is a cross-sectional view taken along line 9—9 of FIG. 8.
Figure 10:
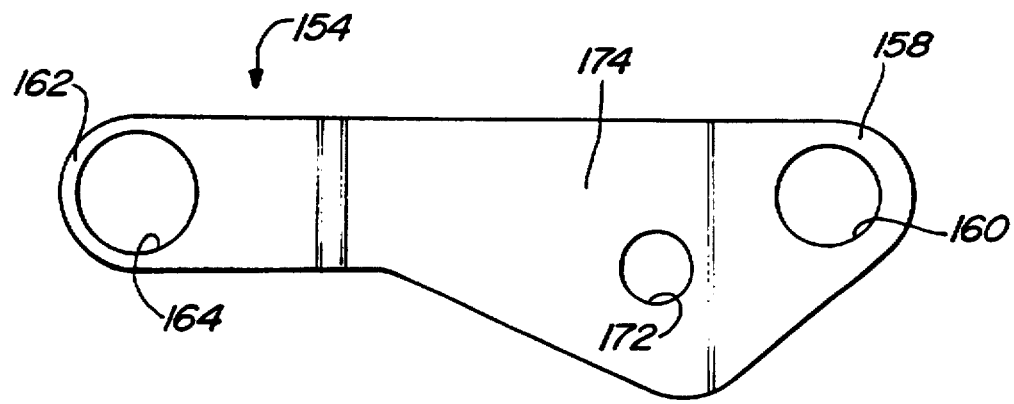
FIG. 10 is an enlarged side view of the tie bar shown in FIG. 2.

As specifically shown in FIG. 8, pivot arm 104 is illustrated to be generally boot-shaped in construction and is configured so as to be partially extended into upwardly extending channels 72 defined by support tubes 70. More particularly, pivot arm 104 is shown to include an upwardly extending portion 140 which is adapted to be positioned within upwardly extending channel 72, as shown in FIG. 3. As shown in FIG. 2, pivot arm 104 associated with outboard pivot assembly 50 is fixedly interconnected with seatback frame 42 through a pair of threaded bolts 142 (shown in FIG. 1) or other suitable fasteners which pass through a pair of threaded apertures 144 and 146 in pivot arm 104 and aligned pairs of apertures (not shown) formed in support tube 70 and outboard beam 54 of seatback frame 42. Apertures 144 and 146 provide two point contact for fixedly interconnecting pivot arm 104 with seatback frame 42.

Figure 5:
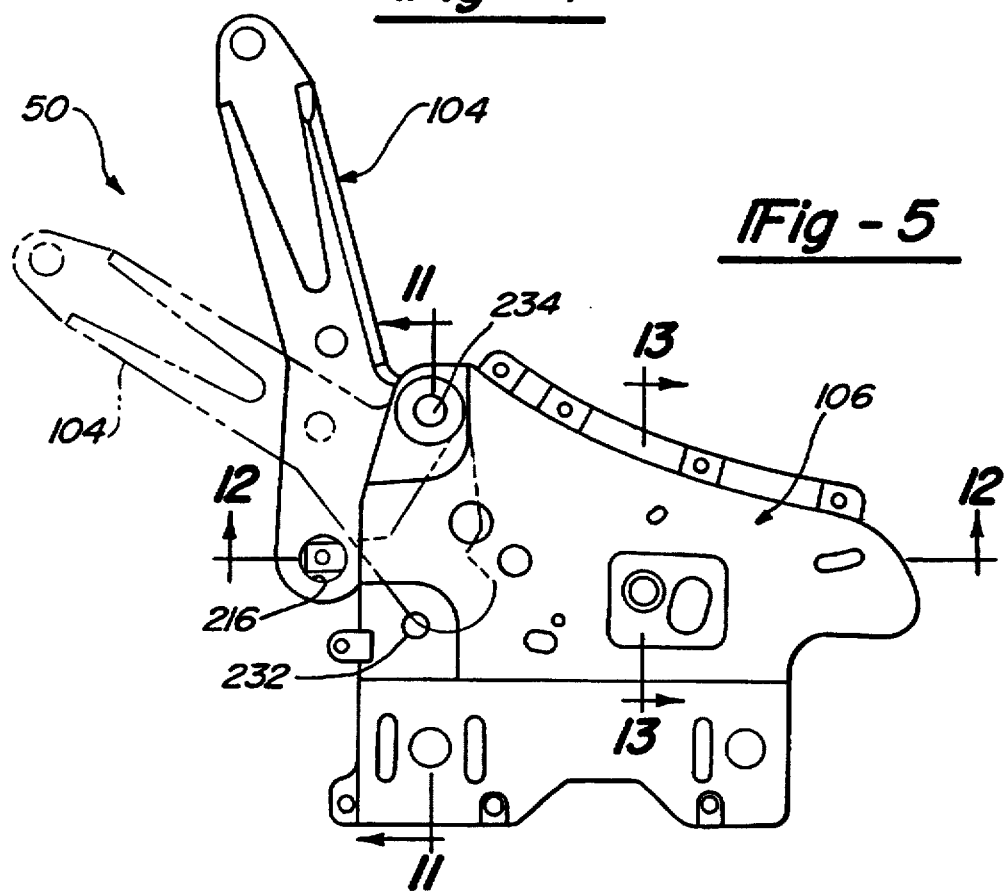
FIG. 5 is an enlarged side view of the outboard pivot assembly of FIGS. 2 and 4.

Pivot arm 104 includes a heel portion 148 including an aperture 150 defining a pivot axis about which pivot arm 104 can be selectively rotated. In this regard, as shown in FIG. 5, pivot arm 104 is shown in solid lines in its standard operating position and in phantom lines in a reclined position. A pivot pin 152 passes through aperture 150 and serves to pivotally interconnect pivot arm 104 and pivot assembly housing 106.

In the embodiment shown in FIGS. 2 through 13, pivot arm 104 is unitarily constructed of aluminum through an extrusion process. However, it will be appreciated by those skilled in the art that pivot arm 104 may be alternatively constructed by forging, casting or by any other well known manner from aluminum or other suitable material exhibiting sufficient strength requirements. Aluminum is a material of choice due to its physical characteristics and relatively light weight. In addition, aluminum is a relatively inexpensive material which is easily formed. In one application, pivot arm 104 is approximately eleven inches in length.

As noted above, outboard pivot assembly 50 is similar in construction and function to inboard pivot assembly 48. With specific reference to FIGS. 4, 10 and 11, the differences residing in outboard pivot assembly 50 will now be discussed. Outboard pivot assembly 50 incorporates a slightly altered construction to accommodate the attachment of safety belt 20 to outboard side 23 of seatback frame 42. Specifically, outboard pivot assembly 50 is illustrated to additionally incorporate means for distributing force loads received from seatback frame 42 and localized at pivot pin 152 which pass through the pivot axis of pivot arm 104. The means for distributing loads received from seatback 42 comprises a generally planar tie bar member 154. Tie bar member 154 is preferably shown to be unitarily constructed of high strength steel or other suitable material and functions to reduce loads concentrated about a pivot axis define by pivot pin 152. A portion of the loads is transferred to multiple points on the pivot assembly housing 106. As a result, the overall weight and dimensions of pivot assembly housing 106 are able to be reduced compared to a housing construction otherwise capable of accommodating the potentially significant loads from seatback frame 42.

Tie bar member 154 is disposed within cavity 111 adjacent the inner side of outer plate member 108. To facilitate general mating of tie bar member 154 with outer plate member 108, tie bar member 154 is formed to include an upper stepped portion and a lower stepped portion. Tie bar member 152 is further formed to include a mounting aperture 160 adjacent a first or upper end 158 which receives pivot pin 152. Similarly, adjacent a second or lower end 162, tie bar member 154 is formed to include a mounting aperture 164. Mounting aperture 164 receives a mounting spacer 166 which is received in apertures 168 and 170 located in outer plate member 108 and inner plate member 110, respectively. A clearance hole 172 is provided in a central portion 174 of tie bar member 154.

Seat assembly 10 is further shown to include a drive arrangement for selectively rotating pivot arm 104 about its pivot axis and thereby rotating seatback 14 between its operating position and its reclined position. The drive arrangement is illustrated as a power-operated linear recliner which includes a drive motor (partially shown at 180)

mounted to a lateral stabilization bracket 182 by bolts (not shown) or other suitable fasteners. Lateral stabilization bracket 182, shown most clearly in FIG. 7, includes a pair of mounting portions 184 disposed at opposite ends of a central portion 186 which are generally perpendicular to central portion 186. Each mounting portion 184 is secured to a mounting flange 188 which is, in turn, secured to a corresponding pivot assembly housing 106.

Drive arrangement is further illustrated to include a drive unit 190 located in cavities 111 of inboard and outboard pivot assemblies 48 and 50. In the embodiment illustrated, each drive unit 190 is a right angle drive unit including a 45° bevel gear 192 interconnected with a threaded lead screw 194. Drive unit 190 includes a pair of cylindrical extensions 196 and 198 which partially extend through apertures 200 and 202 formed in outer plate member 108 and inner plate member 110, respectively. Cylindrical extensions 196 and 198 function to locate drive unit 190 within cavity 111. Each drive unit 190 is interconnected with motor 180 through a drive cable 204. In a manner that will be understood by those skilled in the art, selective actuation of drive motor 180 causes drive cable 204 to rotate in one of two opposite directions, thereby turning bevel gear 192 in one of two opposite directions. Such bi-directional turning of bevel gear 192 results in corresponding bi-directional rotation of lead screw 194.

Lead screw 194 is interconnected with pivot arm 104 for driving pivot arm 104 about its pivot axis. In this regard, pivot arm 104 also includes a toe portion 214 having an internally-threaded aperture 216 which receives an externally-threaded pin 218. Pin 218 is formed to include an internally threaded aperture 220 which is disposed generally perpendicular to the axis defined by pin 218. The internal threads of aperture 220 are operative for engaging the external threads of lead screw 194. Toe portion 214 of pivot arm 104 is further shown to include a pair of flange-like portions 222 and 224 which are spaced apart and through which aperture 216 passes. A space between flanges 222 and 224 provides operational clearance for threaded lead screw 194.

A manually-actuated button (not shown), accessible by the seat occupant in a conventional manner, operates to selectively control drive motor 180 and thereby rotate lead screw 194. As is now apparent, rotation of lead screw 194 causes pivot arm 104 to pivot about its pivot pin 152. In so doing, seatback 14 can be selectively rotated between its standard upright position and various inclined positions, with the degree of reclination of seatback 14 being a function of the rotated position of lead screw 194. While a particular power-operated linear recliner arrangement is disclosed which is arranged to synchronously drive pivot assemblies 48 and 50, a single recliner apparatus could be mounted to the outboard portion of lower seat structure 44 for driving outboard pivot assembly 50 while inboard pivot assembly 48 has no drive arrangement associated therewith. Likewise, various other power-operated and manually-operated linear recliners could also be used in substitution for that disclosed. As such, it is to be understood by those skilled in the art that seat assembly 10 is equipped with a recliner device capable of pivoting seatback 14 relative to seat bottom 12.

As shown in FIG. 6, lower belt retractor 26 is attached to outboard pivot assembly 50 through a bracket 230. Bracket 230 is mounted to a threaded stud 232 and an outwardly extending end 234 of pivot pin 152. One end of safety belt 20 is fixed to and extends upwardly from lower belt retractor 26. Lower belt retractor 26 permits controlled extension and retraction of lap belt portion 38 of safety belt 20. Seat assembly 10 is further shown to include an upper belt retractor 240 mounted to inner track member 80 with bolts (not shown) or other suitable fasteners. As such, the other end of safety belt 20 is fixed to and wound on upper belt retractor 240 to permit controlled extension and retraction of shoulder belt portion 36 of safety belt 20. Safety belt 20 extends upwardly from upper belt retractor 240 toward belt slide assembly 22. As a further option to safety belt restraint system 18, lower belt retractor 26 can be eliminated such that the corresponding end of safety belt 20 is fixedly anchored to the outboard side of lower seat structure 44, whereby all adjustment is provided by upper belt retractor 240 and sliding of tongue plate 28 on safety belt 20.

With reference to the cross-sectional view of FIG. 11, seat assembly 10 is illustrated to be attached to the vehicle floor 242, or sill, through a mounting bracket 244. In this regard, outer track member 78 of slide assembly 76 is fixedly attached to mounting bracket 224 by bolts or rivets (not shown). In turn, mounting bracket 244 is attached to vehicle floor 242 with suitable threaded fasteners 246. Thus, safety belt restraint system 18 is interconnected with the vehicle structure through seat assembly 10.

During a vehicle collision or severe deceleration, the loads applied to seatback 14 by shoulder belt portion 36 of safety belt 20 produce significant loads in seatback frame 42. The loads in seatback frame 42 are transferred to lower seat structure 44 through pivot arrangement 46. Loads are similarly transferred from seatback frame 42 to lower seat structure 44 if the vehicle is subject to a rear-end collision. Thus, an improved design for a pivot arrangement which efficiently and effectively transfers seatback loads to the vehicle structure through a structured vehicle seat is provided.

The pivot assembly of the present invention thus accomplishes the aforementioned objects by permitting safety belt restraint system 18 to be carried by seat assembly 10 for efficiently and effectively overcoming the discussed inconveniences of having the safety belt directly coupled to the vehicle structure while seat assembly 10 is movable relative thereto. In accomplishing these objectives, seat assembly 10 has retained the functional requirements of traditional vehicle seating structures while providing the necessary strength to accommodate the potentially significant loads which may be applied thereto by safety belt restraint system 18.

With particular attention now drawn to FIGS. 14 through 18, a construction for a pivot arm, hereinafter referred to as pivot arm assembly 250, is shown which is adapted to replace pivot arm 104 in the above-described pivot assemblies 48 and 50 or, in the alternative, for use in the arrangement shown in FIG. 14. In general, pivot arm assembly 250, as shown, is adapted for use in connecting the outboard portion of seatback frame 42 to the outboard portion of lower seat structure 44 in a driver-side structured seat assembly 10'. A mirror-image symmetrical opposite version of pivot arm assembly 250 would be used on the inboard portions of seatback frame 42 and lower seat structure 44 if such an auxiliary pivot arm assembly is required for a particular structured seat application. Obviously, in passenger-side structural seat 10, pivot arm assembly 250 would be located on the inboard side thereof, if necessary, and the above-noted mirror-imaged version would be located along the outboard side thereof.

Referring specifically to FIGS. 14 and 15, pivot arm assembly 250 is shown pivotably connecting seatback frame 42 to a portion of lower seat structure 44. Pivot arm assembly 250 has an elongated arm segment 252, a toe segment 254, and a heel segment 256. Arm segment 252 of pivot arm assembly 250 has a pair of apertures 258 that are alignable with a pair of apertures 260 formed through an external surface 262 of outboard beam 54 in proximity to its lower open-end 264. Arm segment 252 is slid into a channel 266 defined by the interior surfaces of outboard beam 54 and placed against an interior surface 268 thereof for aligning apertures 258 with apertures 260. Suitable threaded fasteners, such as bolts 270, are inserted into the aligned apertures and tightened to a predetermined torque level for rigidly fixing arm segment 252 of pivot arm assembly 250 to outboard beam 54. As will be detailed, apertures 258 in arm segment 252 have an internally-threaded portion for receiving the external threads of bolts 270.

Toe segment 254 of pivot arm assembly 250 is pivotally secured to an end of a recliner rod 272 via a suitable hinge pin or bolt 274 retained in aperture 275. Bifurcated end portions of toe segment 254 permit location of recliner rod 272 therebetween. While not intended to limit the invention, recliner rod 272 is associated with a linear recliner mechanism (not shown) of the type having a latching assembly which is normally engaged with recliner rod 272 to prevent linear non-rotational movement thereof and which can be selectively actuated to release recliner rod 272 for sliding movement relative to lower seat structure 44. Since heel segment 256 of pivot arm assembly 250 is pivotably secured to lower seat structure 44 by a suitable hinge pin or bolt 276 retained in aperture 277, such movement of recliner rod 272 results in corresponding pivotal movement of pivot arm assembly 250 and seatback frame 42 relative to lower seat structure 44. Preferably, the linear recliner mechanism functions to permit adjustment of the reclined position of seatback 14 relative to seat cushion 12 as well as forward dumping of seatback 14.

Figure 16:
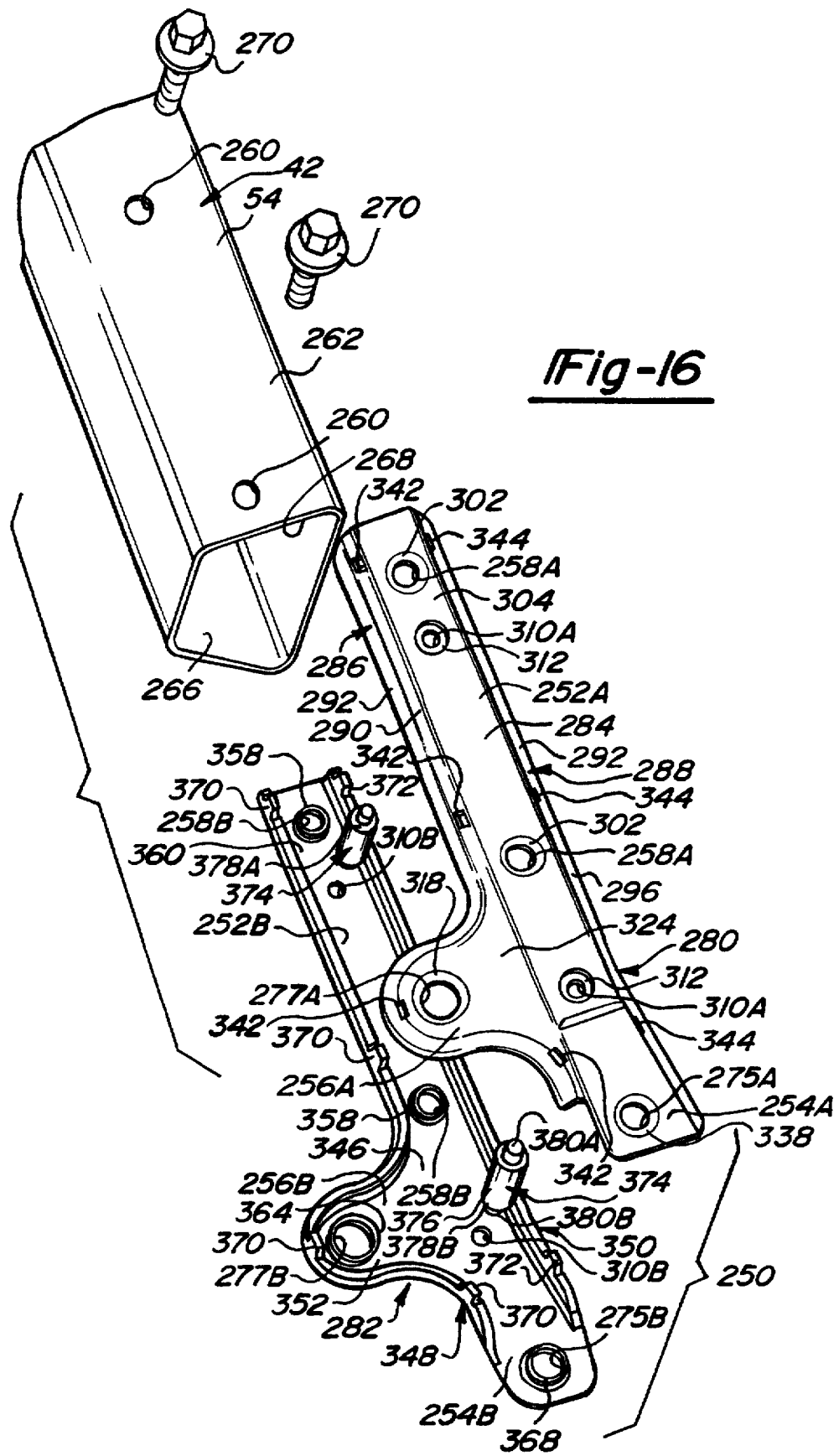
FIG. 16 is an exploded perspective view of the pivot arm assembly shown in FIG. 14.
Figure 22:
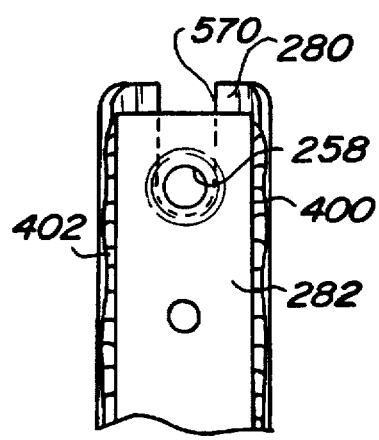
FIG. 22 is a partial view of a modified upper end portion for use with any pivot arm or pivot arm assembly of the present invention.

As best seen from FIG. 16, pivot arm assembly 250 is comprised of an outer arm plate 280 and an inner arm plate 282 that are arranged to define a hollow clam-shell arrangement having a generally rectangular cross-section. In general, outer arm plate 280 includes arm segment 252A, toe segment 254A and heel segment 256A. More particularly, outer arm plate 280 has a generally C-shape cross-sectional configuration including a base portion 284 and a pair of flanges 286 and 288 extending transversely to base portion 284 along opposite lateral sides thereof. Flange 286 is configured to include an arcuate transition portion 290 and a lip portion 292 which both extend along substantially the entire edge of base portion 284. Heel portion 256A of outer arm plate 280 is associated with flange 286 in that it includes an embossed portion 294 which is offset from base portion 284. As seen from FIG. 17, lip portion 292 extends around the periphery of embossed portion 294. In a like manner, flange 288 is configured to include an arcuate transition portion 296 and a lip portion 298 which extends along the opposite lateral edge of base portion 284. Lip portion 298 of flange 288 also include a raised segment 300.

Referring still to FIGS. 16 and 17, arm segment 252A of outer arm plate 280 is shown to include a pair of apertures 258A. Each aperture 258A is formed to include a chamfered surface 302 on an external surface 304 of base portion 284 and an integral extrusion 306 extending from an internal surface 308 of base portion 284. Another pair of aligned apertures 310 are formed in pivot arm assembly 250 with apertures 310A formed in base portion 284 of outer arm plate 280. Each aperture 310A has a countersunk surface 312 extending inwardly from external surface 304 and an extrusion 314 extending from internal surface 308. In addition, aperture 277A is formed in heel segment 256A of outer arm plate 280 through which hinge pin 276 is installed. Aperture 277A includes a chamfered surface 318 formed in an external surface 320 of embossed portion 294 and an extrusion 322 extending from an internal surface 324 of embossed portion 294. Aperture 275A is formed in toe segment 254A of outer arm plate 280 through which hinge pin 274 is installed. Aperture 275A is formed in base portion 284 and includes a chamfered surface 338 extending inwardly from external surface 304 of base portion 284 and an extrusion 340 extending from internal surface 308 of base portion 284. Finally, a series of rectangular apertures 342 are formed in transition portion 290 of flange 286 and a series of rectangular apertures 344 are formed in transition portion 296 of flange 288.

Referring now to FIGS. 16 and 18, inner arm plate 282 is shown to include an arm segment 252B, a toe segment 254B and a heel segment 256B. Inner arm plate 282 has a generally C-shaped cross-sectional configuration including a base portion 346 and a pair of flanges 348 and 350 extending transversely to base portion 344 along opposite lateral sides thereof. Heel portion 256B of inner arm plate 282 is formed as an extension 352 of base portion 346. A pair of apertures 258B are formed in base portion 348 of inner arm plate 282 and which are alienable with apertures 258A in outer arm plate 280 to define apertures 258. Apertures 258B include a chamfered surface 354 formed in an external surface 356 of base portion 346 and an integral extrusion 358 extending from internal surface 360 of base portion 346. In addition, apertures 310B are formed in base portion 346 of inner arm plate 282 and are alignable with apertures 310A in outer arm plate 280 to define apertures 310. Furthermore, aperture 277B is formed in extension 352 of base portion 346 of inner arm plate 282 and is alignable with aperture 277A in outer arm plate 280 to define aperture 277. Aperture 277B includes a chamfered surface 362 formed in external surface 356 and an integral extrusion 364 extending from internal surface 360. Aperture 275B is formed in base portion 346 and is alignable with aperture 275A in outer arm plate 280 to define aperture 275. Aperture 275B includes a chamfered surface 366 formed in external surface 356 of base portion 346 and an integral extrusion 368 extending from internal surface 360 thereof. Finally, a set of upstanding lugs 370 is formed on flange 348 with each lug 370 adapted to extend into a corresponding one of apertures 342 in transition portion 290 of flange 286. Likewise, a series of upstanding lugs 372 is formed on flange 350 with each lug 372 adapted to extend into a corresponding one of apertures 344 formed in flange 288.

When it is desired to assemble pivot arm assembly 250, a pair of spacers 374 are installed in apertures 310. Specifically, each spacer 374 has a spacer segment 376 having opposite edges 378A and 378B and cylindrical mounting posts 380A and 380B extending outwardly therefrom. Mounting post 380A is inserted into aperture 310A in outer arm plate 280 such that surface 378A rests on extrusion 314. Thereafter, lugs 370 and 372 on inner arm plate 282 are inserted into respective ones of apertures 342 and 344 in outer arm plate 280 while posts 380B of spacers 374 are inserted into apertures 310B in inner arm plate 282. In this condition, posts 380A and 380B of spacers 374 extend outwardly beyond external surface 304 of outer arm plate 280 and external surface 356 of inner arm plate 282. Lugs 370 and 372 are adapted for insertion into corresponding apertures 342 and 344 to align arm plates 280 and 282 of pivot arm assembly 250. Preferably, lugs 370 and 372 are sized to closely fit within apertures 342 and 344 to inhibit lateral and axial movement between arm plates 280 and 282. To provide means for securing inner arm plate 282 to outer arm plate 280, the ends of posts 380A and 380B of spacers 374 are deformed (i.e., staked, or swaged). Since external surface 304 of outer arm plate 280 is adapted for installation against surface 268 of outboard beam 54, the deformed end of post 380A is retained with countersink 312 of aperture 310A so as not to extend beyond external surface 304. Due to available clearance, posts 380B do not require corresponding countersinks in apertures 310B, however such could be provided if required.

With outer arm plate 280 connected by spacers 274 to inner arm plate 282 in the manner just described, apertures 258A and 258B are aligned, apertures 277A and 277B are aligned, and apertures 275A and 275B are aligned. In addition, flanges 348 and 350 are located inwardly of and generally juxapositioned adjacent to flanges 286 and 288. While lugs 370 and 372 could be deformed relative to apertures 342 and 344 for assisting in interconnecting outer arm plate 280 to inner arm plate 282, such a process is optional since tightening of bolts 270 through apertures 260 in outboard beam 54 and apertures 258 in pivot arm assembly 250 causes inner arm plate 282 to be tightly drawn against outer arm plate 280. Specifically, flanges 348 and 350 on inner arm plate 282 are tightened against transitional portions 290 and 296 of corresponding flanges 286 and 288 on outer arm plate 280, thereby securing the components in the clam-shell arrangement. To this end, it is preferably that extrusion 358 associated with apertures 258B of inner arm plate 282 have internal threads formed therein to accept the external threads of bolts 270. Optionally, internal threads could be also formed in extrusions 306 associated with apertures 258A in outer arm plate 280 to accept the threads of bolts 270 so as to work in conjunction with threads in extrusions 358 associated with apertures 258B in inner arm plate 282.

According to a preferred construction, both outer arm plate 280 and inner arm plate 282 are fabricated as stamped components from 3.5 mil SAE 1050 steel heat-treated to a hardness in the range of 40–45 Rockwell C. However, those skilled in the art will appreciate that, based on the particular vehicular seating load requirements, variations in the thickness of the material, the type of material and/or the heat treatment thereof are clearly within the scope of the invention which is primarily drawn to the unique construction of pivot arm assembly 250.

Figure 19:
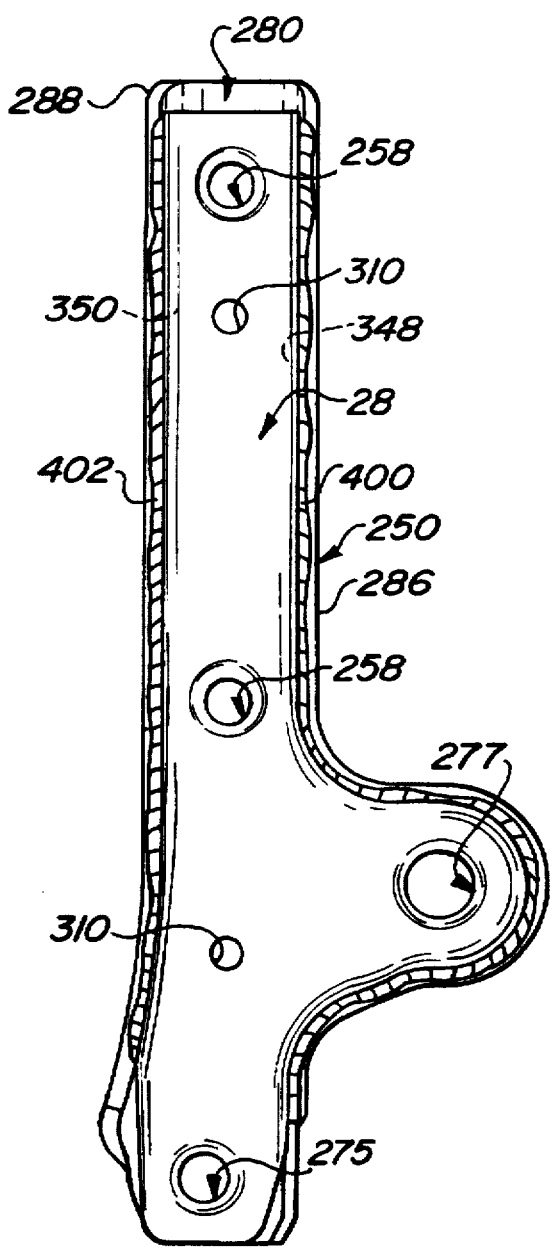
FIG. 19 is a side view of a pivot arm assembly according to another embodiment of the present invention.

FIG. 19 is a side view of a modified pivot arm assembly 250' which is substantially similar to pivot arm assembly 250 with the exception that a welding process is used to connect outer arm plate 280 to inner arm plate 282. Specifically, a continuous line of weld, denoted by numeral 400, is shown between flange 286 of outer arm plate 280 and an external surface of flanges 348 of inner arm plate 282. Another continuous line of weld, denoted by numeral 402, is shown between flange 288 of outer arm segment 280 and flange 350 of inner arm segment 282. Such weld lines can be provided by any suitable welding process known in the industry. Alternatively, spot welds can be provided in place of the continuous lines of weld. Regardless of the type or method, the welding process can be provided in addition to, or as replacement for, the particular connection technique described above for pivot arm assembly 250.

Figure 20:
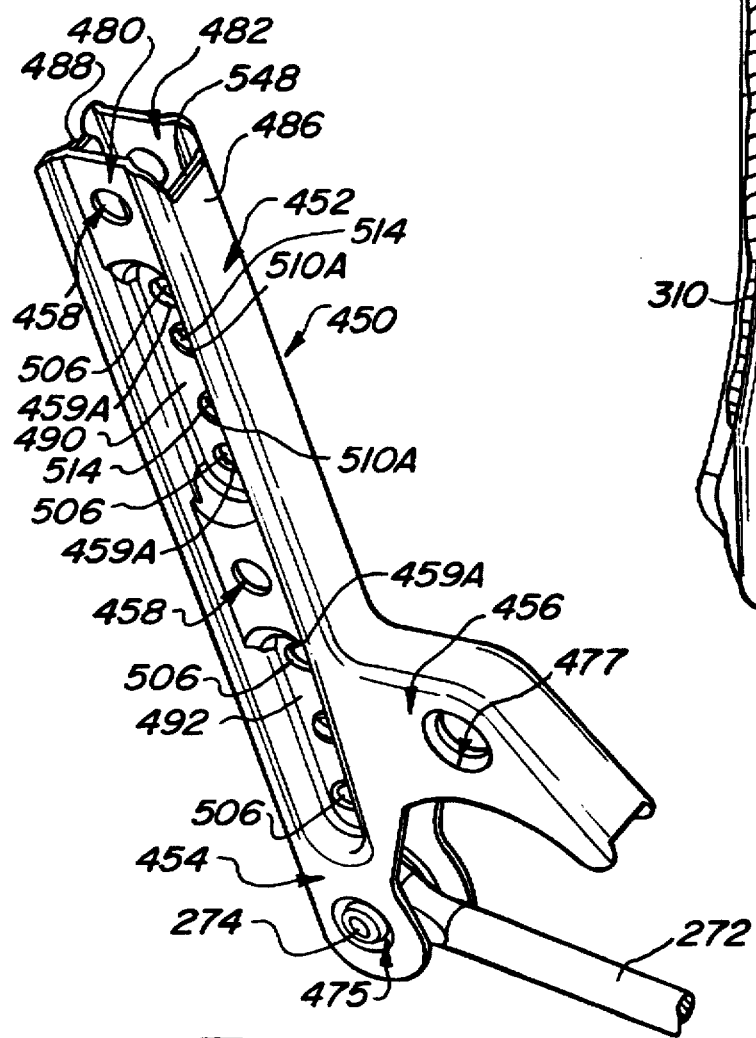
FIG. 20 is a perspective view of a pivot arm assembly constructed according to yet another embodiment of the present invention.
Figure 21:
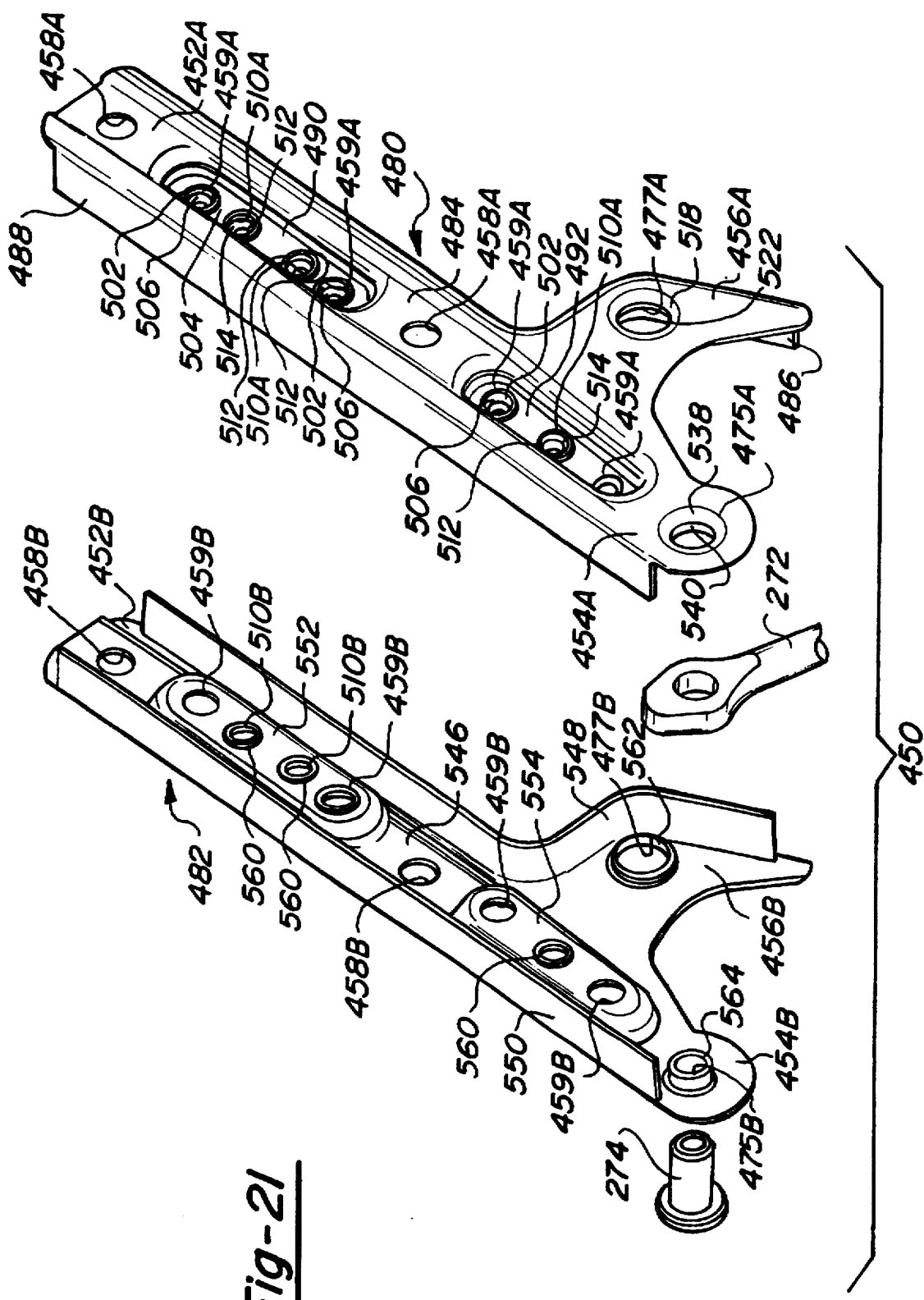
FIG. 21 is an exploded perspective view of the pivot arm assembly shown in FIG. 20.

With particular reference now to FIGS. 20 and 21, yet another version of a clam-shell type pivot arm assembly, identified by reference numeral 450 is shown. In a manner similar to pivot arm assembly 250, pivot arm assembly 450 is adapted to replace pivot arm 104 in the above-described pivot assemblies 48 and 50 or, in the alternative, for use in an arrangement similar to that shown in FIG. 14. Pivot arm assembly 450 has an elongated arm segment 452, a toe segment 454, and an intermediate heel segment 456. Arm segment 452 of pivot arm assembly 450 has a pair of apertures 458 that are alignable with apertures 260 formed in outboard beam 54 associated with seatback frame 42, assuming pivot arm assembly 450 is secured as shown in FIG. 15, in place of pivot arm 250. Arm segment 452 is slid into channel 266 defined by the interior surface of outboard beam 54 and against interior surface 268 thereof for aligning apertures 458 with apertures 260. Again, suitable threaded fasteners, such as bolts 270, are inserted into the aligned apertures and tightened to a predetermined torque level for rigidly fixing arm segment 452 to outboard beam 54. Toe segment 454 of pivot arm assembly 450 is pivotably secured to an end of recliner rod 272 via hinge pin 274 retained in aperture 475. As before, recliner rod 272 is associated with a linear recliner mechanism of the type having a latching assembly which can be selectively actuated for releasing recliner rod 272 for linear non-rotational movement relative to lower seat structure 44. Since heel segment 456 of pivot arm assembly 450 is pivotably secured to lower seat structure 44 by hinge pin 276 retained in aperture 477, such movement of recliner rod 272 results in a corresponding pivotal movement of pivot arm assembly 450 and seatback frame 42 relative to lower seat structure 44.

Pivot arm assembly 450 includes an outer arm plate 480 and an inner arm plate 482 that are adapted for interconnection to define a hollow clam-shell arrangement having a generally rectangular cross-section. Outer arm plate 480 has an arm segment 452A, a toe segment 454A, and a heel segment 456A. In particular, outer arm plate 480 has a generally C-shaped cross-sectional configuration including a base portion 484 and a pair of flanges 486 and 488 extending transversely to base portion 484 along opposite lateral sides thereof. Heel portion 456A of outer arm plate 480 extends outwardly from base portion 484 with flange 486 extending therearound. Outer arm plate 480 is shown to include a pair of apertures 458A formed in arm segment 452A. Base portion 484 of outer arm plate 480 includes a pair of inwardly embossed sections 490 and 492. Upper embossed section 490 includes a pair of apertures 459A which are each formed to include a chamfered surface 502 on external surface 504 of base portion 484 and an integral extrusion 506 formed to extend from an internal surface 508 of base portion 484. Another pair of apertures 510A are formed between apertures 458A and also each includes a chamfered surface 512 on external surface 504 of base portion 484 and an integral extrusion 514 extending from surface 508. Another pair of apertures 459A are formed in lower embossed section 492 which also includes an aperture 510A therebetween. Aperture 477A is formed in heel segment 456A of outer arm plate 480 through which hinge pin 276 is installed. Aperture 475A includes a chamfered edge 518 formed in external surface 504 and an extrusion 522 extending from internal surface 508. Finally, aperture 475A is formed in toe segment 554A of outer arm plate 480A through hinge pin 274 is installed. Aperture 475A is formed in base portion 484 of outer arm plate 482 and includes a chamfered edge 538 and an inwardly extending extrusion 540.

Inner arm plate 482 is shown to include arm segment 452B, toe segment 454B, and heel segment 456B. More specifically, inner arm plate 482 has a C-shaped cross-sectional configuration including a base portion 546 and a pair of flanges 548 and 550 extending transversely to base portion 546 along opposite lateral sides thereof. Inner arm plate 482 includes a pair of inwardly extending embossed sections 552 and 554 which are alignable with embossed sections 490 and 492 on outer arm plate 480. Apertures 458B are formed in base portion 546 of inner arm plate 482 and which are alignable with apertures 458A in outer arm plate 480 to define apertures 458. A pair of apertures 459B are formed in upper embossed section 552 and are adapted to receive extrusions 506 associated with apertures 459A in outer arm plate 480. A pair of apertures 510B are also formed in upper embossed section 552 and have extrusions 560 which are adapted to contact extrusions 514 associated with apertures 510A in outer arm plate 480. Lower embossed section 554 also has an aperture 510B having extrusion 560 abutting extrusion 514 associated with aperture 510A on outer arm plate 480. Once assembled, extrusions 506 are deformed (i.e., staked or swaged) so as to interconnect outer arm plate 480 to inner arm plate 482. As noted, upper embossed section 552 includes apertures 510B which each have integral extrusions 560 which are adapted to engage extrusions 514 associated with apertures 510A in outer arm plate 480 to provide a predetermined spacing between the arm plates prior to joining thereof. As further seen, aperture 477B is formed in heel segment 456B of inner arm plate 482 and includes an integral extending extrusion 562 which together with aperture 477A in outer arm plate 480 defines aperture 477. In a similar manner, aperture 475B is formed in toe segment 454B of inner arm plate 482 and has an inwardly extending integral extrusion 564 such that apertures 475A and 475B are alignable to define aperture 475.

When it is desired to assembly pivot arm assembly 450, extrusions 506 on outer arm plate 480 are inserted into apertures 459B in inner arm plate 482 which results in the alignment of all other corresponding apertures. Moreover, flanges 486 and 488 on outer arm plate 480 are aligned to overlie corresponding flanges 548 and 550 on inner arm plate 482. Thereafter, extrusions 506 are deformed under pressure to tightly interconnect arm plates 480 and 482 together to define the clam-shell assembly shown. In a manner similar to that disclosed in reference to FIG. 19, a welding process could be used in substitution to the swaging process or in combination therewith for connecting arm plates 480 and 482.

As an alternative to each of the pivot arm and pivot arm assemblies described above, a slot 570 can be provided in its arm segment in place of the uppermost aperture. Slot 570 provides assistance in aligning the arm segment with respect to bolts 270 extending through outboard beam 54.

While specific embodiments of the invention has been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as defined in the following claims.

What is claimed is:

1. A structured vehicle seat, comprising:

a lower seat structure;

a seatback frame defining an upwardly extending channel;

a safety belt restraint system mounted to and carried by the structured vehicle seat; and a pivot arm interconnecting said seatback frame to said lower seat structure, said pivot arm including a first arm plate connected to a second arm plate to define a clam-shell pivot arm, said pivot arm having a seatback mounting portion extending within said upwardly extending channel and being fixedly interconnected to said seatback frame, and said pivot arm has a seat mounting portion interconnected to said lower seat structure for rotation about a pivot axis;

said seatback mounting portion of said pivot arm including a pair of spaced apertures which align with a pair of correspondingly spaced apertures in said seatback frame for receiving a pair of fasteners to interconnect said seatback mounting portion of said pivot arm to said seatback frame;

whereby said pivot arm is operative for interconnecting said seatback frame to said lower seat structure such that said seatback frame is selectively adjustable to a plurality of angular positions.

2. The structured vehicle seat of claim 1 wherein said seat mounting portion of said pivot arm includes an aperture receiving a hinge pin for pivotally interconnecting said pivot arm to said lower seat structure.

3. The structured vehicle seat of claim 1 further comprising a drive mechanism for rotating said pivot arm about said pivot axis and thereby pivoting said seatback frame relative to said lower seat structure to adjust the angular position of said seatback frame relative to said lower seat structure.

4. The structured vehicle seat of claim 3 wherein said pivot arm further includes a drive mounting portion having an aperture formed therein for receiving a hinge pin pivotally interconnecting said drive mechanism to said drive mounting portion of said pivot arm.

5. The structured vehicle seat of claim 1 wherein said first arm plate is a generally C-shaped member having a base portion and a transverse flange along opposite sides of said base portion, and wherein said second arm plate is a generally C-shaped member having a base portion and a transverse flange along opposite sides of said base portion, said flanges of said first arm plate are arranged to overlap said flanges of said second arm plate to define said clam-shell pivot arm.

6. The structured vehicle seat of claim 5 wherein a pair of mounting apertures extend through said first and second arm plates which align with a pair of apertures formed in said seatback frame for receiving fasteners to interconnect said pivot arm to said seatback frame.

7. The structured vehicle seat of claim 6 wherein said mounting apertures in said second arm plate are threaded such that threaded fasteners inserted through said seatback frame, through said mounting apertures in said first arm plate and through said mounting apertures in said second arm plate causes said pivot arm to be secured against said seatback frame and also to clamp said second arm plate against said first arm plate.

8. The structured vehicle seat of claim 5 wherein one of said first and second arm plates has upstanding lugs formed on its flanges and the other of said first and second arm plates has apertures formed in either of its base portion or flanges which are adapted to receive said lugs for aligning said first arm plate relative to said second arm plate.

9. The structured vehicle seat of claim 8 further comprising spacers positioned between said first and second arm plates and having posts extending through aligned apertures in said base portions of said first and second arm plates, said posts subsequently being deformed for securing said first arm plate to said second arm plate.

10. The structured vehicle seat of claim 8 wherein said juxtapositioned flanges of said first and second arm plates are welded together to secure said first arm plate to said second arm plate.

11. The structured vehicle seat of claim 5 wherein said juxtapositioned flanges of said first and second arm plates are welded together to secure said first arm plate to said second arm plate.

12. A structured vehicle seat, comprising:
   a lower seat structure;
   a seatback frame having an inboard side and an outboard side, said seatback frame including an upwardly extending channel adjacent said outboard side;
   a safety belt restraint system mounted to and carried by the structured vehicle seat; and
   a pivot arm for interconnecting said seatback frame to said lower seat structure, said pivot arm including a first arm plate connected to a second arm plate to define a clam-shell pivot arm, said pivot arm having an arm segment extending into said upwardly extending channel and fixedly attached to said seatback frame, a heel segment having an aperture receiving a hinge pin for interconnecting said pivot arm to said lower seat structure for rotation about a pivot axis, and a toe segment; and
   a drive mechanism coupled to said toe segment for rotatably driving said pivot arm about said pivot axis;
   said arm segment of said pivot arm including a pair of apertures which align with apertures in said seatback frame for receiving a pair of fasteners to interconnect said arm segment to said seatback frame;
   whereby said pivot arm is operative for interconnecting said seatback frame to said lower seat structure such that said seatback frame is selectively adjustable to a plurality of angular positions.

13. The structured vehicle seat of claim 12 wherein said first arm plate is a generally C-shaped member having a base portion and a transverse flange along opposite sides of said base portion, and wherein said second arm plate is a generally C-shaped member having a base portion and a transverse flange along opposite sides of said base portion, said flanges of said first arm plate are arranged to overlap said flanges of said second arm plate to define said clam-shell pivot arm.

14. The structured vehicle seat of claim 13 wherein a pair of mounting apertures extend through said first and second arm plates which align with a pair of apertures formed in said seatback frame for receiving fasteners to interconnect said pivot arm to said seatback frame.

15. The structured vehicle seat of claim 14 wherein said mounting apertures in said second arm plate are threaded such that threaded fasteners inserted through said seatback frame, through said mounting apertures in said first arm plate and through said mounting apertures in said second arm plate causes said pivot arm to be secured against said seatback frame and also to clamp said second arm plate against said first arm plate.

16. The structured vehicle seat of claim 13 wherein one of said first and second arm plates has upstanding lugs formed on its flanges and the other of said first and second arm plates has apertures formed in either of its base portion or flanges which are adapted to receive said lugs for aligning said first arm plate relative to said second arm plate.

17. The structured vehicle seat of claim 16 further comprising spacers positioned between said first and second arm plates and having posts extending through aligned apertures in said base portions of said first and second arm plates, said posts subsequently being deformed for securing said first arm plate to said second arm plate.

18. The structured vehicle seat of claim 16 wherein said juxtapositioned flanges of said first and second arm plates are welded together to secure said first arm plate to said second arm plate.

19. The structured vehicle seat of claim 13 wherein said juxtapositioned flanges of said first and second arm plates are welded together to secure said first arm plate to said second arm plate.

20. A structured vehicle seat, comprising:
   a lower seat structure;
   a seatback frame defining an upwardly extending channel;
   a safety belt restraint system mounted to and carried by the structured vehicle seat; and
   a pivot arm interconnecting said seatback frame to said lower seat structure, said pivot arm including a first arm plate connected to a second arm plate to define a clam-shell pivot arm, said pivot arm having a seatback mounting portion extending within said upwardly extending channel and being non-rotatably interconnected to said seatback frame, and said pivot arm has a seat mounting portion pivotally interconnected to said lower seat structure for rotation about a pivot axis;
   whereby said pivot arm is operative for interconnecting said seatback frame to said lower seat structure such that said seatback frame is selectively adjustable to a plurality of angular positions.

21. The structured vehicle seat of claim 20, wherein said seatback mounting portion of said pivot arm being attached to said seatback frame at spaced apart points.

22. The structured vehicle seat of claim 20, wherein said seatback mounting portion of said pivot arm including a pair of spaced apertures which align with a pair of correspondingly spaced apertures in said seatback frame for receiving a pair of fasteners to interconnect said seatback mounting portion of said pivot arm to said seatback frame.

23. The structured vehicle seat of claim 20, wherein said first arm plate is a generally C-shaped member having a base portion and a transverse flange along opposite sides of said base portion, and wherein said second arm plate is a generally C-shaped member having a base portion and a transverse flange along opposite sides of said base portion, said flanges of said first arm plate are arranged to overlap said flanges of said second arm plate to define said clam-shell pivot arm.

* * * * *